United States Patent
Morinaka et al.

(10) Patent No.: US 10,840,554 B2
(45) Date of Patent: Nov. 17, 2020

(54) ELECTROLYTE FOR NON-AQUEOUS ELECTROLYTE CELL, AND NON-AQUEOUS ELECTROLYTE CELL WHEREIN SAME IS USED

(71) Applicant: CENTRAL GLASS CO., LTD., Yamaguchi (JP)

(72) Inventors: Takayoshi Morinaka, Ube (JP); Makoto Kubo, Ube (JP); Wataru Kawabata, Ube (JP); Masutaka Shinmen, Ube (JP); Hiroki Matsuzaki, Ube (JP); Mikihiro Takahashi, Ube (JP)

(73) Assignee: CENTRAL GLASS CO., LTD., Yamaguchi (JP)

( * ) Notice: Subject to any disclaimer, the term of this patent is extended or adjusted under 35 U.S.C. 154(b) by 58 days.

(21) Appl. No.: 16/064,741

(22) PCT Filed: Dec. 22, 2016

(86) PCT No.: PCT/JP2016/088588
§ 371 (c)(1),
(2) Date: Jun. 21, 2018

(87) PCT Pub. No.: WO2017/111143
PCT Pub. Date: Jun. 29, 2017

(65) Prior Publication Data
US 2018/0375158 A1 Dec. 27, 2018

(30) Foreign Application Priority Data

Dec. 22, 2015 (JP) .................................. 2015-250364
Nov. 17, 2016 (JP) .................................. 2016-224154

(51) Int. Cl.
*H01M 10/0569* (2010.01)
*H01M 10/0567* (2010.01)
(Continued)

(52) U.S. Cl.
CPC ....... *H01M 10/0569* (2013.01); *H01M 4/366* (2013.01); *H01M 4/505* (2013.01); *H01M 4/525* (2013.01); *H01M 6/16* (2013.01); *H01M 10/052* (2013.01); *H01M 10/0525* (2013.01); *H01M 10/0567* (2013.01); *H01M 10/0568* (2013.01); *H01M 2004/027* (2013.01);
(Continued)

(58) Field of Classification Search
CPC .......... H01M 10/052; H01M 10/0525; H01M 10/0567; H01M 10/0569; H01M 4/366; H01M 4/505; H01M 4/525; H01M 6/16
See application file for complete search history.

(56) References Cited

U.S. PATENT DOCUMENTS

| 7,709,157 B2 | 5/2010 | Mie et al. |
| 10,211,480 B2 * | 2/2019 | Morinaka ........... H01M 10/052 |

(Continued)

FOREIGN PATENT DOCUMENTS

| CN | 102617414 | 8/2012 |
| EP | 2 698 350 | 2/2014 |

(Continued)

OTHER PUBLICATIONS

International Search Report dated Mar. 21, 2017 in International (PCT) Application No. PCT/JP2016/088588.
(Continued)

*Primary Examiner* — Robert S Jones, Jr.
*Assistant Examiner* — Rachel L Zhang
(74) *Attorney, Agent, or Firm* — Wenderoth, Lind & Ponack, L.L.P.

(57) ABSTRACT

Provided is an electrolyte for a non-aqueous electrolyte battery, which can provide, when used in a non-aqueous electrolyte battery, in a good balance, an effect to suppress an increase in an internal resistance at a low temperature and an effect to suppress an increase in an amount of gas generated at a high temperature, as well as a non-aqueous electrolyte battery containing such an electrolyte. The non-aqueous electrolyte comprises a non-aqueous solvent and at least a hexafluorophosphate and/or tetrafluoroborate as a solute, and further comprises at least one imide anion-containing salt represented by the following general formula [1] but does not contain a silane compound represented by the following general formula [2] or an ionic complex represented by, for example, the following general formula [3].

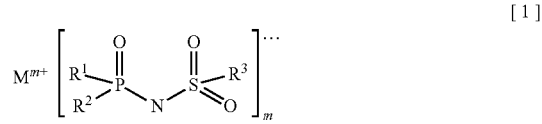

[1]

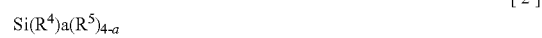

[2]

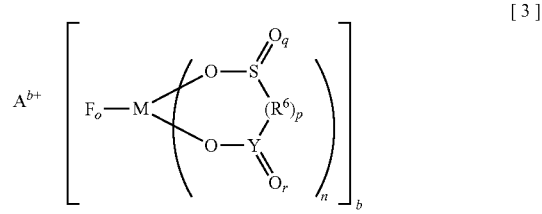

[3]

10 Claims, No Drawings

(51) Int. Cl.
    *H01M 10/052*     (2010.01)
    *H01M 10/0568*     (2010.01)
    *H01M 6/16*     (2006.01)
    *H01M 4/36*     (2006.01)
    *H01M 4/505*     (2010.01)
    *H01M 4/525*     (2010.01)
    *H01M 10/0525*     (2010.01)
    *H01M 4/02*     (2006.01)

(52) U.S. Cl.
    CPC ............. *H01M 2004/028* (2013.01); *H01M 2300/0028* (2013.01); *Y02E 60/122* (2013.01); *Y02T 10/7011* (2013.01)

(56) References Cited

U.S. PATENT DOCUMENTS

| | | | |
|---|---|---|---|
| 10,424,794 B2 * | 9/2019 | Takahashi | H01M 10/0569 |
| 2004/0106047 A1 | 6/2004 | Mie et al. | |
| 2014/0193706 A1 | 7/2014 | Morinaka et al. | |
| 2017/0204124 A1 * | 7/2017 | Takahashi | H01M 10/052 |

FOREIGN PATENT DOCUMENTS

| | | |
|---|---|---|
| EP | 3 425 718 | 1/2019 |
| JP | 2000-123867 | 4/2000 |
| JP | 2004-165151 | 6/2004 |
| JP | 2013-30465 | 2/2013 |
| JP | 2013-51122 | 3/2013 |
| WO | WO 2016002774 * | 10/2016 |

OTHER PUBLICATIONS

Extended European Search Report dated Jul. 11, 2019 in corresponding European Patent Application No. 16879029.3.

Office Action dated Nov. 22, 2019 in corresponding Korean Patent Application No. 10-2018-7021088 with English translation.

* cited by examiner

ELECTROLYTE FOR NON-AQUEOUS ELECTROLYTE CELL, AND NON-AQUEOUS ELECTROLYTE CELL WHEREIN SAME IS USED

TECHNICAL FIELD

The present invention relates to an electrolyte for a non-aqueous electrolyte battery, which can provide, when used in a non-aqueous electrolyte battery, in a good balance, an effect to suppress an increase in an internal resistance at a low temperature and an effect to suppress an amount of gas generated at a high temperature, as well as a non-aqueous electrolyte battery comprising such an electrolyte.

BACKGROUND ART

In recent years, storage systems to be applied to small equipment that needs high energy density, such as information-technology-related equipment or communication equipment, specifically, personal computers, video cameras, digital still cameras, and cell phones, and storage systems to be applied to large equipment that needs high power, such as auxiliary power and energy storage for electric vehicles, hybrid electric vehicles and fuel cell electric vehicles have received attention. A non-aqueous electrolyte battery such as a lithium ion battery, a lithium battery, a lithium ion capacitor or a sodium ion battery has been actively developed as a candidate thereof.

Many of these non-aqueous electrolyte batteries have already been put into practical use, while none of these batteries are sufficient for various applications in terms of respective characteristics. In particular, a battery to be applied for a vehicle such as an electric vehicle is required to have high input output characteristics even in a cold season. Hence, improvement in low-temperature characteristics is important. Moreover, such a battery is required to have high-temperature cycle characteristics such that it is capable of maintaining its characteristics (less increase in internal resistance) even when charging and discharging are performed repeatedly under a high-temperature environment. For the purpose of weight reduction of batteries, laminated films such as aluminum-laminated films are often used as an exterior component of batteries. Such laminated-type batteries have a problem in that gas tends to be generated inside the batteries to cause deformation such as expansion.

As a means for improving the high temperature characteristic of a non-aqueous electrolyte battery and the battery characteristic of the battery (cycle characteristic) when the battery is repeatedly charged and discharged, optimization of various battery components including active materials of positive electrodes and negative electrodes has been studied. A non-aqueous electrolyte-related technology is not an exception, and it has been proposed that deterioration due to decomposition of an electrolyte on the surface of an active positive electrode or an active negative electrode is suppressed by various additives. For example, Patent Document 1 proposes that battery characteristics are improved by the addition of a vinylene carbonate to an electrolyte. However, there was a problem in that, while battery characteristics at high temperatures are improved, the internal resistance is significantly increased to lower the low-temperature characteristic. Furthermore, a number of examinations on the addition of an imide salt to an electrolyte have been conducted. For example, a method (Patent Document 2) for suppressing deterioration in a high-temperature cycle characteristic or a high-temperature storage characteristic by combining a specific sulfonimide salt or a phosphoryl imide salt with an oxalato complex, and a method (Patent Document 3) for suppressing deterioration in a cycle characteristic or an output characteristic by combining a specific sulfonimide salt with a fluorophosphate have been proposed.

PRIOR ART DOCUMENTS

Patent Documents

Patent Document 1: JP Patent Publication (Kokai) No. 2000-123867 A
Patent Document 2: JP Patent Publication (Kokai) No. 2013-051122 A
Patent Document 3: JP Patent Publication (Kokai) No. 2013-030465 A

SUMMARY OF THE INVENTION

Problem to be Solved by the Invention

The low-temperature characteristic and high-temperature storage characteristic exerted by the non-aqueous electrolyte batteries using the non-aqueous electrolytes disclosed in the above prior art documents are not completely satisfactory and still remain to be improved. In applications under harsher conditions, for example, an electrolyte for a non-aqueous electrolyte battery is demanded to be capable of suppressing elevation in an internal resistance at a low temperature not higher than $-30°$ C. and suppressing an amount of gas generated at a high temperature not lower than $70°$ C., as well as a non-aqueous electrolyte battery containing such an electrolyte are demanded.

The present invention has an object to provide an electrolyte for a non-aqueous electrolyte battery, which is capable of exhibiting, in a good balance, an effect to suppress increase in internal resistance at a low temperature and an effect to suppress an amount of gas generated at a high temperature when it is used in a non-aqueous electrolyte battery, as well as a non-aqueous electrolyte battery containing the electrolyte.

Means for Solving the Problem

The inventors of the present invention have conducted intensive research to solve the above problems and, as a result, have found that a non-aqueous electrolyte for a non-aqueous electrolyte battery comprising a non-aqueous solvent and a solute, wherein the solute comprises at least a hexafluorophosphate and/or tetrafluoroborate and wherein the electrolyte further comprises an imide anion-containing salt with a specific structure, can exhibit, in a good balance, an effect to suppress an increase in internal resistance at a low temperature and an effect to suppress an amount of gas generated at a high temperature, when it is used in a non-aqueous electrolyte battery. Based on this finding, the present invention has now been completed.

The Applicant of the present invention filed Japanese Patent Application No. 2015-030411 relating to an invention of an electrolyte for a non-aqueous electrolyte battery wherein the electrolyte has an excellent low-temperature output characteristic and is capable of exhibiting an excellent cycle characteristic and an excellent storage characteristic at a high temperature, as well as to an invention of a non-aqueous electrolyte battery containing the electrolyte. Japanese Patent Application No. 2015-030411 also discloses an invention of an electrolyte for a non-aqueous electrolyte battery, comprising a salt containing an imide anion represented by the following general formula [1] and a silane compound represented by the following general formula [2]:

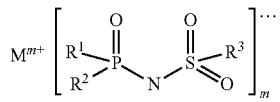

[in the general formula [1], $R^1$ to $R^3$ each independently represent a fluorine atom or an organic group selected from a linear or branched $C_{1-10}$ alkyl group, a linear or branched $C_{1-10}$ alkoxy group, a $C_{2-10}$ alkenyl group, a $C_{2-10}$ alkenyloxy group, a $C_{2-10}$ alkynyl group, a $C_{2-10}$ alkynyloxy group, a $C_{3-10}$ cycloalkyl group, a $C_{3-10}$ cycloalkoxy group, a $C_{3-10}$ cycloalkenyl group, a $C_{3-10}$ cycloalkenyloxy group, a $C_{6-10}$ aryl group, and a $C_{6-10}$ aryloxy group, wherein a fluorine atom, an oxygen atom, or an unsaturated bond may be present in the organic group and at least one of $R^1$ to $R^3$ represents a fluorine atom; $M^{m+}$ represents an alkali metal cation, an alkaline-earth metal cation, or an onium cation; and m is an integer equivalent to the number of valence of a corresponding cation]

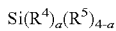 [2]

[in the general formula [2], each $R^4$ independently represents a group having a carbon-carbon unsaturated bond; each $R^5$ independently represents a linear or branched $C_{1-10}$ alkyl group, which may contain a fluorine atom and/or an oxygen atom; and a is an integer of 2 to 4].

The applicant of the present invention also filed Japanese Patent Application No. 2015-130613, which is an invention related to an electrolyte for a non-aqueous electrolyte battery wherein the electrolyte contains a material suitable for a non-aqueous electrolyte battery with high-temperature durability and also related to a non-aqueous electrolyte battery containing the electrolyte. Japanese Patent Application No. 2015-130613 also describes an electrolyte for a non-aqueous electrolyte battery wherein the electrolyte contains an imide anion-containing salt represented by the following general formula [1] and at least one ionic complex represented by any one of the following general formulae [3] to [5]:

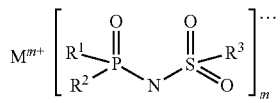

[in the general formula [1],
$R^1$ to $R^3$ each independently represent a fluorine atom or an organic group selected from a linear or branched $C_{1-10}$ alkyl group, a linear or branched $C_{1-10}$ alkoxy group, a $C_{2-10}$ alkenyl group, a $C_{2-10}$ alkenyloxy group, a $C_{2-10}$ alkynyl group, a $C_{2-10}$ alkynyloxy group, a $C_{1-10}$ cycloalkyl group, a $C_{1-10}$ cycloalkoxy group, a $C_{3-10}$ cycloalkenyl group, a $C_{3-10}$ cycloalkenyloxy group, a $C_{6-10}$ aryl group, and a $C_{6-10}$ aryloxy group, wherein a fluorine atom, an oxygen atom, or an unsaturated bond may be present in the organic group; and
at least one of $R^1$ to $R^3$ represents a fluorine atom; $M^{m+}$ represents an alkali metal cation, an alkaline-earth metal cation, or an onium cation; and m is an integer equivalent to the valence of the corresponding cation]

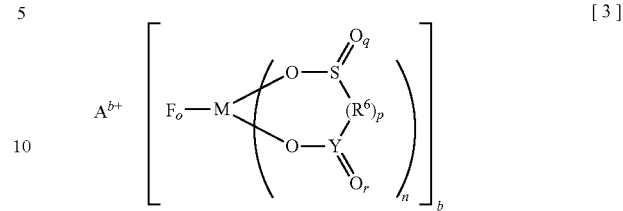

[in the general formula [3],
$A^{b+}$ represents at least one selected from the group consisting of a metal ion, a proton, and an onium ion;
F represents a fluorine atom;
M represents at least one type selected from the group consisting of a Group 13 element (Al, B), a Group 14 element (Si), and a Group 15 element (P, As, Sb);
O represents an oxygen atom;
S represents a sulfur atom;
$R^6$ represents a hydrocarbon group which may have a ring, a heteroatom, or a halogen atom, the hydrocarbon group having 1 to 10 carbon atoms ($R^6$ can also have a branched chain or a ring structure when a number of carbon atoms is 3 or more), or $—N(R^7)—$; $R^7$ represents a hydrocarbon group which may have a ring, a heteroatom, or a halogen atom, the hydrocarbon group having 1 to 10 carbon atoms ($R^7$ can also have a branched chain or a ring structure when a number of carbon atoms is 3 or more);
Y represents a carbon atom or a sulfur atom; in the case wherein Y represents a carbon atom, r is 1; in the case wherein Y represents a sulfur atom, r is 1 or 2; and
b is 1 or 2; o is 2 or 4; n is 1 or 2; p is 0 or 1; q is 1 or 2; r is 0, 1 or 2; and in the case wherein p is 0, a direct bond is formed between S and Y]

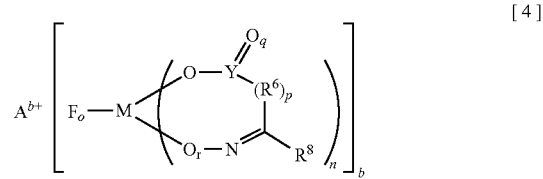

[in the general formula [4],
$A^{b+}$ represents at least one type selected from the group consisting of a metal ion, a proton, and an onium ion;
F represents a fluorine atom;
M represents at least one type selected from the group consisting of a Group 13 element (Al, B), a Group 14 element (Si), and a Group 15 element (P, As, Sb);
O represents an oxygen atom;
N represents a nitrogen atom;
Y represents a carbon atom or a sulfur atom; in the case wherein Y represents a carbon atom, q is 1; in the case wherein Y represents a sulfur atom, q is 1 or 2;
$R^6$ represents a hydrocarbon group which may have a ring, a heteroatom, or a halogen atom, the hydrocarbon group having 1 to 10 carbon atoms ($R^6$ can also have a branched chain or a ring structure when a number of carbon atoms is 3 or more), or $—N(R^7)—$; $R^7$ represents a hydrogen atom, an alkali metal, a hydrocarbon group which may have a ring, a heteroatom, or a halogen atom, the hydrocarbon group having 1 to 10 carbon atoms ($R^7$ can also have a branched chain or a ring structure when a number of carbon atoms is 3 or more);

$R^8$ represents a hydrogen atom, a hydrocarbon group which may have a ring, a heteroatom, or a halogen atom, the hydrocarbon group having 1 to 10 carbon atoms ($R^8$ can also have a branched chain or a ring structure when a number of carbon atoms is 3 or more), or —N($R^7$)—; $R^7$ represents a hydrogen atom, an alkali metal, a hydrocarbon group which may have a ring, a heteroatom, or a halogen atom, the hydrocarbon group having 1 to 10 carbon atoms ($R^7$ can also have a branched chain or a ring structure when a number of carbon atoms is 3 or more); and b is 1 or 2; o is 2 or 4; n is 1 or 2; p is 0 or 1; q is 1 or 2; r is 0 or 1; in the case wherein p is 0, the atoms positioning at both sides of $R^6$ (specifically, Y and a carbon atom) form a direct bond; and in the case wherein r is 0, a direct bond is formed between M and N]

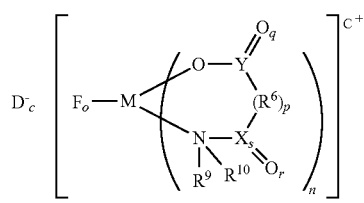

[5]

[in the general formula [5],

D represents at least one selected from a halogen ion, a hexafluorophosphate anion, a tetrafluoroborate anion, a bis(trifluoromethanesulfonyl)imide anion, a bis(fluorosulfonyl)imide anion, a (fluorosulfonyl) (trifluoromethanesulfonyl)imide anion, and a bis(difluorophosphonyl)imide anion;

F represents a fluorine atom;

M represents one type selected from the group consisting of a Group 13 element (Al, B), a Group 14 element (Si), and a Group 15 element (P, As, Sb);

O represents an oxygen atom;

N represents a nitrogen atom;

Y represents a carbon atom or a sulfur atom; in the case wherein Y represents a carbon atom, q is 1; in the case wherein Y represents a sulfur atom, q is 1 or 2;

X represents a carbon atom or a sulfur atom; in the case wherein X represents a carbon atom, r is 1; in the case wherein X represents a sulfur atom, r is 1 or 2;

$R^6$ represents a hydrocarbon group which may have a ring, a heteroatom, or a halogen atom, the hydrocarbon group having 1 to 10 carbon atoms ($R^6$ can also have a branched chain or a ring structure when a number of carbon atoms is 3 or more), or —N($R^7$)—; $R^7$ represents a hydrogen atom, an alkali metal, a hydrocarbon group which may have a ring, a heteroatom, or a halogen atom, the hydrocarbon group having 1 to 10 carbon atoms ($R^7$ can also have a branched chain or a ring structure when a number of carbon atoms is 3 or more); and $R^9$ and $R^{10}$ independently represent a hydrocarbon group which may have a ring, a heteroatom, or a halogen atom, the hydrocarbon group having 1 to 10 carbon atoms ($R^9$ and $R^{10}$ can also have a branched chain or a ring structure when a number of carbon atoms is 3 or more); and a ring structure containing $R^9$ and $R^{10}$ represented by the following general formula [6] may be formed;

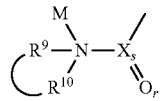

[6]

c is 0 or 1; in the case wherein n is 1, c is 0 (in the case wherein c is 0, D does not exist); in the case wherein n is 2, c is 1;

o is 2 or 4; n is 1 or 2; p is 0 or 1; q is 1 or 2; r is 1 or 2; s is 0 or 1; in the case wherein p is 0, a direct bond is formed between Y and X; and in the case wherein s is 0, N($R^9$) ($R^{10}$) is directly bonded to $R^6$; in this case, any one of the following structures [7] to [10] may be formed; in the case wherein the direct bond is a double bond as in [8] and [10], $R^{10}$ does not exist; a structure having a double bond may be present outside the ring as in [9]; in this case, $R^{11}$ and $R^{12}$ independently represent a hydrogen atom, or a hydrocarbon group which may have a ring, a heteroatom, or a halogen atom, the hydrocarbon group having 1 to 10 carbon atoms ($R^{11}$ and $R^{12}$ can also have a branched chain or a ring structure when a number of carbon atoms is 3 or more)].

[7]

[8]

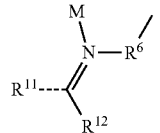

[9]

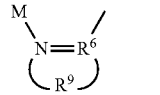

[10]

The inventors of the present invention continued their research and have found that even when a non-aqueous electrolyte for a non-aqueous electrolyte battery does not comprise the silane compound represented by the general formula [2] or the ionic complex represented by the general formulae [3] to [5], the non-aqueous electrolyte is still capable of exhibiting, in a good balance, an effect to suppress an increase in internal resistance at a low temperature and an effect to suppress an amount of gas generated at a high temperature compared to the conventional electrolytes. Thus, the present invention has now been completed.

More specifically, the present invention provides an electrolyte for a non-aqueous electrolyte battery (hereinafter, also simply referred to as "non-aqueous electrolyte" or "electrolyte"), comprising a non-aqueous solvent and a solute, wherein a solute comprises at least a hexafluorophosphate and/or tetrafluoroborate; wherein at least one of a salt containing an imide anion represented by the following general formula [1] (hereinafter, also simply referred to as "imide anion-containing salt"); and wherein the electrolyte does not contain a silane compound represented by the following general formula [2] or an ionic complex represented by any one of the following general formulae [3] to [5]:

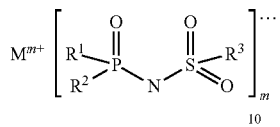
[1]

[in the general formula [1], $R^1$ to $R^3$ each independently represent a fluorine atom or an organic group selected from a linear or branched $C_{1-10}$ alkyl group, a linear or branched $C_{1-10}$ alkoxy group, a $C_{2-10}$ alkenyl group, a $C_{2-10}$ alkenyloxy group, a $C_{2-10}$ alkynyl group, a $C_{2-10}$ alkynyloxy group, a $C_{3-10}$ cycloalkyl group, a $C_{3-10}$ cycloalkoxy group, a $C_{3-10}$ cycloalkenyl group, a $C_{3-10}$ cycloalkenyloxy group, a $C_{6-10}$ aryl group, and a $C_{6-10}$ aryloxy group, wherein a fluorine atom, an oxygen atom, or an unsaturated bond may be present in the organic group and at least one of $R^1$ to $R^3$ represents a fluorine atom; $M^{m+}$ represents an alkali metal cation, an alkaline-earth metal cation, or an onium cation; and m is an integer equivalent to the valence of the corresponding cation];

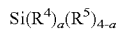
[2]

[in the general formula [2], each $R^4$ independently represents a group having a carbon-carbon unsaturated bond; each $R^5$ independently represents a linear or branched $C_{1-10}$ alkyl group, which may contain a fluorine atom and/or an oxygen atom; and a is an integer of 2 to 4];

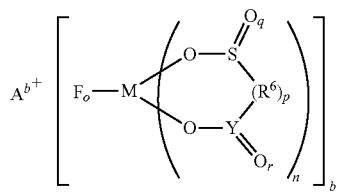
[3]

[in the general formula [3], $A^{b+}$ represents at least one selected from the group consisting of a metal ion, a proton, and an onium ion;

F represents a fluorine atom;

M represents at least one selected from the group consisting of a Group 13 element (Al, B), a Group 14 element (Si), and a Group 15 element (P, As, Sb);

O represents an oxygen atom;

S represents a sulfur atom;

$R^6$ represents a hydrocarbon group which may have a ring, a heteroatom, or a halogen atom, the hydrocarbon group having 1 to 10 carbon atoms ($R^6$ can also have a branched chain or a ring structure when a number of carbon atoms is 3 or more), or $-N(R^7)-$; $R^7$ represents a hydrogen atom, an alkali metal, a hydrocarbon group which may have a ring, a heteroatom, or a halogen atom, the hydrocarbon group having 1 to 10 carbon atoms ($R^7$ can also have a branched chain or a ring structure when a number of carbon atoms is 3 or more);

Y represents a carbon atom or a sulfur atom; in the case wherein Y represents a carbon atom, r is 1; in the case wherein Y represents a sulfur atom, r is 1 or 2; and b is 1 or 2; o is 2 or 4; n is 1 or 2; p is 0 or 1; q is 1 or 2; r is 0, 1 or 2; and in the case wherein p is 0, a direct bond is formed between S and Y];

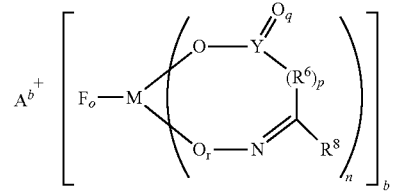
[4]

[in the general formula [4], $A^{b+}$ represents at least one selected from the group consisting of a metal ion, a proton, and an onium ion;

F represents a fluorine atom;

M represents at least one selected from the group consisting of a Group 13 element (Al, B), a Group 14 element (Si), and a Group 15 element (P, As, Sb);

O represents an oxygen atom;

N represents a nitrogen atom;

Y represents a carbon atom or a sulfur atom; in the case wherein Y represents a carbon atom, q is 1; in the case wherein Y represents a sulfur atom, q is 1 or 2;

$R^6$ represents a hydrocarbon group which may have a ring, a heteroatom, or a halogen atom, the hydrocarbon group having 1 to 10 carbon atoms ($R^6$ can also have a branched chain or a ring structure when a number of carbon atoms is 3 or more), or $-N(R^7)-$; $R^7$ represents a hydrogen atom, an alkali metal, a hydrocarbon group which may have a ring, a heteroatom, or a halogen atom, the hydrocarbon group having 1 to 10 carbon atoms ($R^7$ can also have a branched chain or a ring structure when a number of carbon atoms is 3 or more);

$R^8$ represents a hydrogen atom, a hydrocarbon group which may have a ring, a heteroatom, or a halogen atom, the hydrocarbon group having 1 to 10 carbon atoms ($R^8$ can also have a branched chain or a ring structure when a number of carbon atoms is 3 or more), or $-N(R^7)-$; $R^7$ represents a hydrogen atom, an alkali metal, a hydrocarbon group which may have a ring, a heteroatom, or a halogen atom, the hydrocarbon group having 1 to 10 carbon atoms ($R^7$ can also have a branched chain or a ring structure when a number of carbon atoms is 3 or more); and b is 1 or 2; o is 2 or 4; n is 1 or 2; p is 0 or 1; q is 1 or 2; r is 0 or 1; in the case wherein p is 0, the atoms positioning at both ends of $R^6$ (specifically, Y and a carbon atom) form a direct bond; and in the case wherein r is 0, a direct bond is formed between M and N];

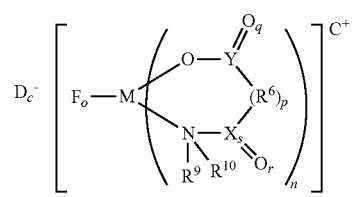
[5]

[in the general formula [5],

D represents at least one selected from a halogen ion, a hexafluorophosphate anion, a tetrafluoroborate anion, a bis(trifluoromethanesulfonyl)imide anion, a bis(fluorosulfonyl)imide anion, a (fluorosulfonyl)(trifluoromethanesulfonyl)imide anion, and a bis(difluorophosphonyl)imide anion;

F represents a fluorine atom;

M represents one selected from the group consisting of a Group 13 element (Al, B), a Group 14 element (Si), and a Group 15 element (P, As, Sb);

O represents an oxygen atom;

N represents a nitrogen atom;

Y represents a carbon atom or a sulfur atom; in the case wherein Y represents a carbon atom, q is 1; in the case wherein Y represents a sulfur atom, q is 1 or 2;

X represents a carbon atom or a sulfur atom; in the case wherein X represents a carbon atom, r is 1; in the case wherein X represents a sulfur atom, r is 1 or 2;

$R^6$ represents a hydrocarbon group which may have a ring, a heteroatom, or a halogen atom, the hydrocarbon group having 1 to 10 carbon atoms ($R^6$ can also have a branched chain or a ring structure when a number of carbon atoms is 3 or more), or —N($R^7$)—; $R^7$ represents a hydrogen atom, an alkali metal, a hydrocarbon group which may have a ring, a heteroatom, or a halogen atom, the hydrocarbon group having 1 to 10 carbon atoms ($R^7$ can also have a branched chain or a ring structure when a number of carbon atoms is 3 or more); and $R^9$ and $R^{10}$ independently represent a hydrocarbon group which may have a ring, a heteroatom, or a halogen atom, the hydrocarbon group having 1 to 10 carbon atoms ($R^9$ and $R^{10}$ can also have a branched chain or a ring structure when a number of carbon atoms is 3 or more); and a ring structure containing $R^9$ and $R^{10}$ as represented by the following general formula [6] may be formed;

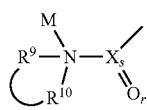

[6]

c is 0 or 1; in the case wherein n is 1, c is 0 (in the case wherein c is 0, D does not exist); in the case wherein n is 2, c is 1;

o is 2 or 4; n is 1 or 2; p is 0 or 1; q is 1 or 2; r is 1 or 2; s is 0 or 1; in the case wherein p is 0, a direct bond is formed between Y and X; and in the case wherein s is 0, N($R^9$) ($R^{10}$) is directly bonded to $R^6$; in this case, any one of the following structures [7] to [10] may be formed; in the case wherein the direct bond is a double bond as in [8] or [10], $R^{10}$ does not exist; a structure having a double bond may be present outside the ring as in [9]; in this case, $R^{11}$ and $R^{12}$ independently represent a hydrogen atom, or a hydrocarbon group which may have a ring, a heteroatom, or a halogen atom, the hydrocarbon group having 1 to 10 carbon atoms, wherein when a number of carbon atoms is 3 or more, $R^{11}$ and $R^{12}$ can also have a branched chain or a ring structure].

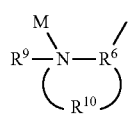

[7]

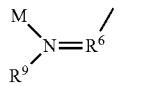

[8]

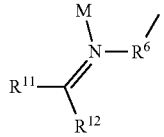

[9]

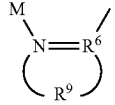

[10]

The expression that the electrolyte "do(es) not contain" means a condition wherein the concentration of the total amount of the compounds represented by the general formula [2] and the general formulae [3] to [5] in the total amount of the electrolyte is lower than 5 ppm by mass. The concentration of the silane compound represented by the general formula [2] in the electrolyte may be measured by gas chromatography, for example. The concentration of the ionic complex represented by the general formulae [3] to [5] in the electrolyte may be measured by IR (infrared spectroscopy), for example.

The action mechanism for improving battery characteristics in accordance with the present invention is not clear. However, it is considered that the imide anion-containing salt represented by the general formula [1] is partially decomposed at the boundary between a positive electrode and an electrolyte, and the boundary between a negative electrode and the electrolyte, so as to form a film, thereby the film prevents the decomposition of a non-aqueous solvent or a solute by suppressing a direct contact between the non-aqueous solvent or the solute with an active material, so as to suppress the deterioration of the battery performance (resistance increase and gas generation). It is important for an imide anion to have both of a phosphoryl site (—P(=O)R) and a sulfone site (—S(=O)$_2$R), although the mechanism thereof is unclear. It is considered that incorporation of both of a phosphoryl site and a sulfone site into the above film results in an improved strength of the thus formed film, which film has high lithium conductivity; that is, low resistance (film having a good output characteristic). Furthermore, the above effect suggests that an imide anion contains a site with a high electron-withdrawing property (e.g., a fluorine atom and a fluorine-containing alkoxy group) to further increase the degree of uneven distribution of electric charge, and thus a film with a lower resistance (film having a better output characteristic) is formed. It is further assumed that, when a hexafluorophosphate anion or a tetrafluoroborate anion is contained, the resulting film becomes a complex film containing such a fluoride and this film has an improved stability at a high temperature. It is assumed based on the above reasons that an effect to improve a low-temperature output characteristic and an effect to suppress an amount of gas generated during storage at a high temperature are exerted in a good balance by the non-aqueous electrolyte of the present invention.

In the case wherein the imide anion-containing salt contains at least one P—F bond or S—F bond, an excellent low-temperature characteristic is obtained. The higher the number of P—F bonds and S—F bonds in the imide anion-containing salt, the more improved the low-temperature characteristic may be, and accordingly the number is preferably high. The imide anion-containing salt represented by the general formula [1] is further preferably a compound wherein all of $R^1$ to $R^3$ are fluorine atoms.

The imide anion-containing salt represented by the general formula [1] is preferably a compound wherein
at least one of $R^1$ to $R^3$ represents a fluorine atom, and
at least one of $R^1$ to $R^3$ is selected from hydrocarbon groups containing six or less carbon atoms and optionally containing a fluorine atom.

The imide anion-containing salt represented by the general formula [(1] is preferably a compound wherein
at least one of $R^1$ to $R^3$ represents a fluorine atom, and
at least one of $R^1$ to $R^3$ is selected from a methyl group, a methoxy group, an ethyl group, an ethoxy group, a propyl group, a propoxyl group, a vinyl group, an allyl group, an allyloxy group, an ethynyl group, a 2-propynyl group, a 2-propynyloxy group, a phenyl group, a phenyloxy group, a 2,2-difluoroethyl group, a 2,2-difluoroethyloxy group, a 2,2,2-trifluoroethyl group, a 2,2,2-trifluoroethyloxy group, a 2,2,3,3-tetrafluoropropyl group, a 2,2,3,3-tetrafluoropropyloxy group, a 1,1,1,3,3,3-hexafluoroisopropyl group, and a 1,1,1,3,3,3-hexafluoroisopropyloxy group.

A counter cation of the imide anion-containing salt represented by the general formula [1] is preferably selected from the group consisting of a lithium ion, a sodium ion, a potassium ion, and a tetraalkylammonium ion.

As a solute, at least one type selected from the group consisting of $LiPF_2(C_2O_4)_2$, $LiPF_4(C_2O_4)$, $LiP(C_2O_4)_3$, $LiBF_2(C_2O_4)$, $LiB(C_2O_4)_2$, $LiPO_2F_2$, $LiN(F_2PO)_2$, $LiN(FSO_2)_2$, $LiN(CF_3SO_2)_2$, $LiN(CF_3SO_2)(FSO_2)$, $LiSO_3F$, $NaPF_2(C_2O_4)_2$, $NaPF_4(C_2O_4)$, $NaP(C_2O_4)_3$, $NaBF_2(C_2O_4)$, $NaB(C_2O_4)_2$, $NaPO_2F_2$, $NaN(F_2PO)_2$, $NaN(FSO_2)_2$, $NaSO_3F$, $NaN(CF_3SO_2)_2$, and $NaN(CF_3SO_2)(FSO_2)$ may be further comprised.

The amount of the imide anion-containing salt represented by the general formula [1] added preferably ranges from 0.005 to 12.0 mass % relative to the total amount of the non-aqueous solvent, the solute, and the imide anion-containing salt represented by the general formula [1]. In the case wherein the content is higher than 12.0 mass %, the viscosity of the electrolyte would be liable to become high and a low-temperature characteristic would be liable to be impaired. In the case wherein the content is lower than 0.005 mass %, film formation may be insufficient and an effect to improve characteristics would tend not to be obtained.

The imide anion-containing salt represented by the general formula [1] is preferably highly pure. In particular, the Cl (chlorine) content of the imide anion-containing salt, as a raw material, before being dissolved in the electrolyte is preferably not higher than 5000 ppm by mass, particularly further preferably not higher than 1000 ppm by mass.

The lower the concentration of free acid in the electrolyte, the less likely a positive electrode active material and a collector of the resulting non-aqueous electrolyte battery corrode. Accordingly, the concentration of free acid is preferably low. The concentration of free acid is preferably not higher than 600 ppm by mass, more preferably not higher than 120 ppm by mass.

The electrolyte may further comprise at least one additive selected from the group consisting of vinylene carbonate, vinylethylene carbonate, fluoroethylene carbonate, 1,6-diisocyanatohexane, ethynylethylene carbonate, trans-difluoroethylene carbonate, propane sultone, propene sultone, 1,3,2-dioxathiolan-2,2-dioxide, 4-propyl-1,3,2-dioxathiolan-2,2-dioxide, methylene methane disulfonate, 1,2-ethanedisulfonic anhydride, tris(trimethylsilyl)borate, succinonitrile, (ethoxy)pentafluorocyclotriphosphazene, t-butylbenzene, t-amylbenzene, fluorobenzene, and cyclohexylbenzene.

The non-aqueous solvent is preferably at least one type selected from the group consisting of a cyclic carbonate, a chain carbonate, a cyclic ester, a chain ester, a cyclic ether, a chain ether, a sulfone compound, a sulfoxide compound, and an ionic liquid. A cyclic carbonate is further preferably contained, and one or more selected from ethylene carbonate, propylene carbonate, fluoroethylene carbonate, vinylene carbonate, and vinylethylene carbonate are particularly preferably contained.

The present invention further provides a non-aqueous electrolyte battery comprising at least a positive electrode, a negative electrode, and the electrolyte for a non-aqueous electrolyte battery described above.

Effects of the Invention

The electrolyte of the present invention is capable of exerting, in a good balance, an effect to suppress an increase in internal resistance at a low temperature and an effect to suppress an amount of gas generated at a high temperature, when it is used in a non-aqueous electrolyte battery.

MODES FOR CARRYING OUT THE INVENTION

The present invention will be further described below in detail. However, explanations for constituent features described below are merely examples of the embodiments of the present invention, and the scope of the present invention is not limited to these specific embodiments. Various modifications may be carried out within the scope of the present invention.

1. Electrolyte for Non-Aqueous Electrolyte Battery:

An electrolyte for a non-aqueous electrolyte battery of the present invention is an electrolyte for a non-aqueous electrolyte battery comprising a non-aqueous solvent and a solute, wherein the salute comprises at least a hexafluorophosphate and/or tetrafluoroborate and wherein the electrolyte comprises at least one imide anion-containing salt represented by the general formula [1] and does not comprise a silane compound represented by the general formula [2] or an ionic complex represented by the general formulae [3] to [5].

1-1. Imide Anion-Containing Salt Represented by General Formula [1]:

It is important that in the general formula [1], at least one of $R^1$ to $R^3$ represents a fluorine atom. There is no certain reason but an effect to suppress internal resistance of the resulting battery containing the electrolyte is not sufficiently provided unless at least one of these groups is a fluorine atom.

In the general formula [1], examples of the alkyl group and the alkoxyl group represented by $R^1$ to $R^3$ include $C_{1-10}$ alkyl groups and fluorine-containing alkyl groups such as a methyl group, an ethyl group, a propyl group, an isopropyl group, a butyl group, a sec-butyl group, a tert-butyl group, a pentyl group, a 2,2-difluoroethyl group, a 2,2,2-trifluoroethyl group, a 2,2,3,3-tetrafluoropropyl group, and a 1,1,1,3,3,3-hexafluoroisopropyl group and alkoxy groups derived from these groups.

Examples of the alkenyl group and the alkenyloxy group include $C_{2-10}$ alkenyl groups and fluorine-containing alkenyl groups such as a vinyl group, an allyl group, a 1-propenyl group, an isopropenyl group, a 2-butenyl group, and a 1,3-butadienyl group and alkenyloxy groups derived from these groups.

Examples of the alkynyl group and the alkynyloxy group include $C_{2-10}$ alkynyl groups and fluorine-containing alkynyl groups such as an ethynyl group, a 2-propynyl group, and a 1,1 dimethyl-2-propynyl group and alkynyloxy groups derived from these groups.

Examples of the cycloalkyl group and the cycloalkoxy group include $C_{3-10}$ cycloalkyl groups and fluorine-containing cycloalkyl groups such as a cyclopentyl group and a cyclohexyl group and cycloalkoxy groups derived from these groups.

Examples of the cycloalkenyl group and the cycloalkenyloxy group include $C_{3-10}$ cycloalkenyl groups and fluorine-containing cycloalkenyl groups such as a cyclopentenyl group and a cyclohexenyl group and cycloalkenyloxy groups derived from these groups.

Examples of the aryl group and the aryloxy group include $C_{6-10}$ aryl groups and fluorine-containing aryl groups such as a phenyl group, a tolyl group, and a xylyl group and aryloxy groups derived from these groups.

Specific examples of the anion of the imide anion-containing salt represented by the general formula [1] include the following compounds No. 1 to No. 18. However, the imide anion-containing salt used in the present invention is not limited by these compounds.

Compound No. 1

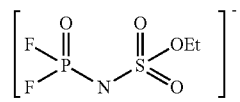

Compound No. 2

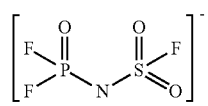

Compound No. 3

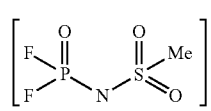

Compound No. 4

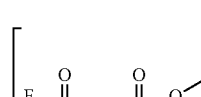

Compound No. 5

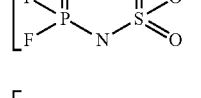

Compound No. 6

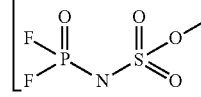

Compound No. 7

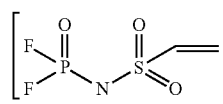

Compound No. 8

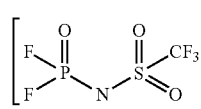

Compound No. 9

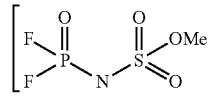

Compound No. 10

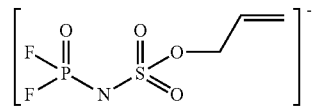

Compound No. 11

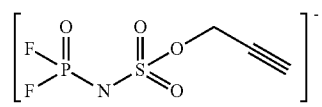

Compound No. 12

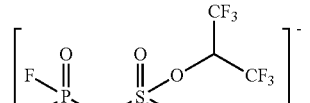

Compound No. 13

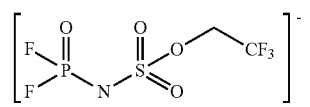

Compound No. 14

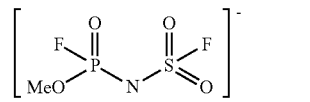

Compound No. 15

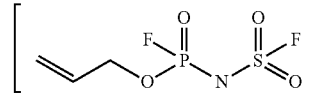

Compound No. 16

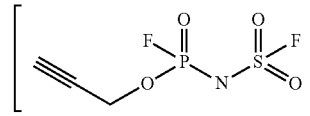

Compound No. 17

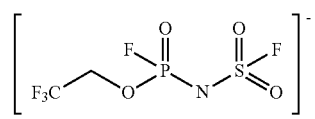

Compound No. 18

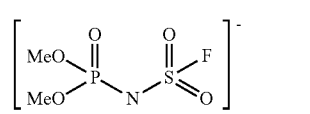

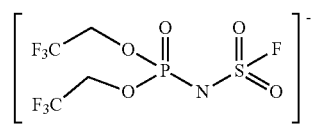

The imide anion-containing salt represented by the general formula [1] is preferably a compound wherein at least one of $R^1$ to $R^3$ represents a fluorine atom and at least one of $R^1$ to $R^3$ is selected from hydrocarbon groups containing six or less carbon atoms and optionally containing a fluorine atom. When the number of carbon atoms in the hydrocarbon group is greater than six, internal resistance tends to be relatively high, upon the formation of a film on an electrode. The number of carbon atoms is preferably not greater than six because in the case wherein the number of carbon atoms is not greater than six, the internal resistance tends to be lower. The hydrocarbon group is particularly preferably at least one group selected from a methyl group, an ethyl group, a propyl group, a vinyl group, an allyl group, an ethynyl group, a 2-propynyl group, a phenyl group, a trifluoromethyl group, a 2,2-difluoroethyl group, a 2,2,2-trifluoroethyl group, a 2,2,3,3-tetrafluoropropyl group, a 1,1,1,3,3,3-hexafluoroisopropyl group, and alkoxy groups, alkenyloxy groups, and alkynyloxy groups derived from these groups, because in the case wherein the hydrocarbon group is such a group, the resulting non-aqueous electrolyte battery is capable of exhibiting a cycle characteristic and an internal resistance characteristic in a good balance.

The imide anion-containing salt represented by the general formula [1] is preferably highly pure. The Cl (chlorine) content of the imide anion-containing salt in a state of a raw material before dissolved in an electrolyte, in particular, is preferably not higher than 5000 ppm by mass, more preferably not higher than 1000 ppm by mass, further preferably not higher than 100 ppm by mass. Use of an imide anion-containing salt with a high concentration of remaining Cl (chlorine) is unpreferable, because such a salt tends to cause corrosion of a battery component.

The imide anion-containing salt represented by the general formula [1] may be produced by various methods. The method of production is not limited and the following methods may be employed, for example.

A method of reacting a corresponding phosphoramide ($H_2NP(=O)R^1R^2$) with a corresponding sulfonyl halide ($R^3SO_2X$, wherein X is a halogen atom) in the presence of an organic base or an inorganic base.

A method of reacting a corresponding sulfonylamide ($H_2NSO_2R^3$) with a corresponding phosphoryl halide ($R^1R^2P(=O)X$, wherein X is a halogen atom) in the presence of an organic base or an inorganic base.

Alternatively, the production may be carried out, as described in Patent Documents (CN101654229A, CN102617414A), by first employing the above-mentioned method to obtain an imide anion-containing salt that corresponds to the imide anion-containing salt but wherein the site to be occupied by a fluorine atom is occupied by a halogen atom other than a fluorine atom and then carrying out fluorination.

The amount of the imide anion-containing salt used in the present invention added relative to the total amount of the non-aqueous solvent described below, the solute described below, and the imide anion-containing salt represented by the general formula [1] is as follows: the suitable lower limit is not lower than 0.005 mass %, preferably not lower than 0.05 mass %, much preferably not lower than 0.1 mass %; and the suitable upper limit is not higher than 12.0 mass %, preferably not higher than 6.0 mass %, much preferably not higher than 3.0 mass %.

When the amount of the imide anion-containing salt is lower than 0.005 mass %, the effect to improve battery characteristics tends not to be sufficient and accordingly such amount is not preferable. On the other hand, when the amount of the imide anion-containing salt is higher than 12.0 mass %, not only no further improvement effect due to the increase in the amount is obtained and accordingly such amount is useless but also excessive film formation resultantly proceeds and leads to a tendency toward an increase in resistance and deterioration of battery performance, and therefore, such amount is not preferable. As long as the amount thereof does not exceed 12.0 mass %, the imide anion-containing salt may be used alone or two or more kinds of the imide anion-containing salt may be used in any combination and in any ratio according to the application.

1-2. Solute

The electrolyte for a non-aqueous electrolyte battery of the present invention comprises at least a hexafluorophosphate and/or tetrafluoroborate as a solute.

The kind of an additional solute that may be used in combination with the hexafluorophosphate and/or tetrafluoroborate used in the electrolyte for a non-aqueous electrolyte battery of the present invention is not particularly limited, and any electrolyte salt may be used. Specific examples thereof include: for a lithium battery and a lithium-ion battery, electrolyte salts including $LiPF_2(C_2O_4)_2$, $LiPF_4(C_2O_4)$, $LiP(C_2O_4)_3$, $LiBF_2(C_2O_4)$, $LiB(C_2O_4)_2$, $LiPO_2F_2$, $LiN(F_2PO)_2$, $LiN(FSO_2)_2$, $LiN(CF_3SO_2)_2$, $LiClO_4$, $LiAsF_6$, $LiSbF_6$, $LiCF_3SO_3$, $LiSO_3F$, $LiN(C_2FSO_2)_2$, $LiN(CF_3SO_2)(FSO_2)$, $LiC(CF_3SO_2)_3$, $LiPF_3(C_3F_7)_3$, $LiB(CF_3)_4$, and $LiBF_3(C_2F_5)$; and for a sodium-ion battery, electrolyte salts including $NaPF_2(C_2O_4)_2$, $NaPF_4(C_2O_4)$, $NaP(C_2O_4)_3$, $NaBF_2(C_2O_4)$, $NaB(C_2O_4)_2$, $NaPO_2F_2NaN(F_2PO)_2$, $NaN(FSO_2)_2$, $NaN(CF_3SO_2)_2$, $NaClO_4$, $NaAsF_6$, $NaSbF_6$, $NaCF_3SO_3$, $NaSO_3F$, $NaN(C_2F_5SO_2)_2$, $NaN(CF_3SO_2)(FSO_2)$, $NaC(CF_3SO_2)_3$, $NaPF_3(C_3F_7)_3$, $NaB(CF_3)_4$, and $NaBF_3(C_2F_5)$. These solutes may be used alone, or two or more of these solutes may be used in any combination and in any ratio according to the application. In terms of, for example, the energy density, the output characteristics, and the service life of the resulting battery, $LiPF_2(C_2O_4)_2$, $LiPF_4(C_2O_4)$, $LiP(C_2O_4)_3$, $LiBF_2(C_2O_4)$, $LiB(C_2O_4)_2$, $LiPO_2F_2$, $LiN(F_2PO)_2$, $LiN(FSO_2)_2$, $LiN(CF_3SO_2)_2$, $LiN(CF_3SO_2)(FSO_2)$, $LiSO_3F$, $NaPF_2(C_2O_4)_2$, $NaPF_4(C_2O_4)$, $NaP(C_2O_4)_3$, $NaBF_2(C_2O_4)$, $NaB(C_2O_4)_2$, $NaPO_2F_2$, $NaN(F_2PO)_2$, $NaN(FSO_2)_2$, $NaN(CF_3SO_2)_2$, $NaSO_3F$, and NaN$(CF_3SO_2)(FSO_2)$ are preferable among them.

A suitable combination of these solutes is, for example, a combination of at least one selected from the group consisting of $LiPF_2(C_2O_4)_2$, $LiPF_4(C_2O_4)$, $LiP(C_2O_4)_3$, $LiBF_2(C_2O_4)$, $LiB(C_2O_4)_2$, $LiPO_2F_2$, $LiN(F_2PO)_2$, $LiN(FSO_2)_2$, $LiN(CF_3SO_2)_2$, $LiN(CF_3SO_2)(FSO_2)$, and $LiSO_3F$ with $LiPF_6$.

In the case wherein a combination of at least one selected from the group consisting of $LiPF_2(C_2O_4)_2$, $LiPF_4(C_2O_4)$, $LiP(C_2O_4)_3$, $LiBF_2(C_2O_4)$, $LiB(C_2O_4)_2$, $LiPO_2F_2$, $LiN(F_2PO)_2$, $LiN(FSO_2)_2$, $LiN(CF_3SO_2)_2$, $LiN(CF_3SO_2)(FSO_2)$, and $LiSO_3F$ with $LiPF_6$ is used as a solute, the ratio therebetween (molar ratio where the amount of $LiPF_6$ is set at 1 mole) usually ranges from 1:0.001 to 1:0.5, preferably 1:0.01 to 1:0.2. In the case wherein a combination of the solutes in the above-mentioned ratio is used, an effect to further improve various battery characteristics is obtained. On the other hand, when the ratio of $LiPF_6$ is lower than 1:0.5, there is a tendency toward a decrease in the ionic conductivity of the electrolyte and an increase in resistance.

The concentration of the solutes (the total concentration of the hexafluorophosphate and/or tetrafluoroborate) is not particularly limited, but the suitable lower limit thereto is not lower than 0.5 mol/L, preferably not lower than 0.7 mol/L, much preferably not lower than 0.9 mol/L and the suitable upper limit thereto is not higher than 2.5 mol/L, preferably not higher than 2.0 mol/L, much preferably not higher than 1.5 mol/L. When the concentration of the solutes is lower than 0.5 mol/L, the ionic conductivity decreases and thereby the cycle characteristic and the output characteristic of the resulting non-aqueous electrolyte battery tend to decrease. On the other hand, when the concentration of the solutes is higher than 2.5 mol/L, the viscosity of the resulting electrolyte for a non-aqueous electrolyte battery increases and thereby the ionic conductivity tends to decrease, potentially leading to a decrease in the cycle characteristic and the output characteristic of the resulting non-aqueous electrolyte battery.

When a large amount of a solute is dissolved at once in a non-aqueous solvent, the heat of dissolution derived from a solute may cause an elevation in the temperature of the non-aqueous electrolyte. When the liquid temperature greatly increases, degradation of a lithium salt containing a fluorine atom is promoted, potentially leading to production of hydrogen fluoride. Hydrogen fluoride may cause a decrease in the battery performance and therefore is not preferable. Because of this reason, the liquid temperature at the time of dissolving a solute in a non-aqueous solvent is preferably −20 to 80° C., more preferably 0 to 60° C., while it is not particularly limited.

1-3. Non-Aqueous Solvent

The kind of a non-aqueous solvent used in the electrolyte for a non-aqueous electrolyte battery of the present invention is not particularly limited, and any non-aqueous solvent may be used. Specific examples thereof include cyclic carbonates such as propylene carbonate (hereinafter, also referred to as "PC"), ethylene carbonate (hereinafter, also referred to as "EC"), and butylene carbonate, chain carbonates such as diethyl carbonate (hereinafter, also referred to as "DEC"), dimethyl carbonate (hereinafter, also referred to as "DMC"), and ethyl methyl carbonate (hereinafter, also referred to as "EMC"), cyclic esters such as γ-butyrolactone and γ-valerolactone, chain esters such as methyl acetate, methyl propionate, and ethyl propionate (hereinafter, also referred to as "EP"), cyclic ethers such as tetrahydrofuran, 2-methyltetrahydrofuran, and dioxane, chain ethers such as dimethoxyethane and diethyl ether, and sulfone compounds and sulfoxide compounds such as dimethyl sulfoxide and sulfolane. For example, ionic liquids, which do not belong to the same category as that of the non-aqueous solvent, may also be used. The non-aqueous solvent used in the present invention may be used alone or two or more of them may be used in any combination and at any ratio according to the application. From the viewpoints of electrochemical stability of the non-aqueous solvent against oxidation-reduction and chemical stability of the non-aqueous solvent against heat and/or during reaction with the solute, propylene carbonate, ethylene carbonate, diethyl carbonate, dimethyl carbonate, ethyl methyl carbonate, methyl propionate, and ethyl propionate are particularly preferable among them.

For example, when one or more kinds of cyclic carbonates, which have a high dielectric constant, and one or more kinds of chain carbonates or chain esters, which have a high liquid viscosity, are used as the non-aqueous solvent, the ionic conductivity of the electrolyte is increased and such use is therefore preferable. More specifically, any of the following combinations is more preferably contained:
(1) combination of EC and EMC;
(2) combination of EC and DEC;
(3) combination of EC, DMC, and EMC;
(4) combination of EC, DEC, and EMC;
(5) combination of EC, EMC, and EP;
(6) combination of PC and DEC;
(7) combination of PC and EMC;
(8) combination of PC and EP;
(9) combination of PC, DMC, and EMC;
(10) combination of PC, DEC, and EMC;
(11) combination of PC, DEC, and EP;
(12) combination of PC, EC, and EMC;
(13) combination of PC, EC, DMC, and EMC;
(14) combination of PC, EC, DEC, and EMC; and
(15) combination of PC, EC, EMC, and EP.

1-4. Additives

The fundamental construction of the electrolyte for a non-aqueous electrolyte battery of the present invention is as described above. Unless the gist of the present invention is impaired, generally used additives may be added to the electrolyte for a non-aqueous electrolyte battery of the present invention at any ratio. Specific examples include compounds with an effect to prevent excessive charging, an effect to form a negative electrode film, and/or an effect to protect a positive electrode, such as cyclohexylbenzene, biphenyl, t-butylbenzene, t-amylbenzene, fluorobenzene, vinylene carbonate (hereinafter, also referred to as "VC"), vinylethylene carbonate, difluoroanisole, fluoroethylene carbonate (hereinafter, also referred to as "FEC"), 1,6-diisocyanatohexane, ethynylethylene carbonate, trans-difluoroethylene carbonate, propane sultone, propenesultone, dimethylvinylene carbonate, 1,3,2-dioxathiolan-2,2-dioxide, 4-propyl-1,3,2-dioxathiolan-2,2-dioxide, methylene methane disulfonate, 1,2-ethanedisulfonic anhydride, tris (trimethylsilyl)borate, succinonitrile, and (ethoxy)pentafluorocyclotriphosphazene. An alkali metal salt other than the solute (lithium salt, sodium salt) or the imide anion-containing salt represented by the general formula [1] (lithium salt, sodium salt) (and other than the ionic complex represented by the general formulae [3] to [5]) may also be used as an additive. Specific examples thereof include carboxylates such as lithium acrylate, sodium acrylate, lithium methacrylate, and sodium methacrylate and sulfuric acid ester salts such as lithium methyl sulfate, sodium methyl sulfate, lithium ethyl sulfate, and sodium methyl sulfate.

Alternatively, as in the case of a non-aqueous electrolyte battery called lithium polymer battery, the electrolyte for a non-aqueous electrolyte battery may be used in a quasi-solid state obtained with the use of a gelator or a crosslinking polymer.

The electrolyte for a non-aqueous electrolyte battery of the present invention may contain four or more types of alkali metal salts in total, by using plural kinds of the solutes (lithium salt, sodium salt) and the imide anion-containing salts represented by the general formula [1] (lithium salt, sodium salt), in accordance with the properties demanded.

For example, four kinds of lithium salts are selected, the following combinations are used:
a combination of one selected from lithium hexafluorophosphate and lithium tetrafluoroborate (hereinafter, also referred to as "first solute"), one selected from $LiPF_4(C_2O_4)$, $LiPF_2(C_2O_4)_2$, $LiP(C_2O_4)_3$, $LiBF_2(C_2O_4)$, $LiB(C_2O_4)_2$, $LiPO_2F_2$, $LiN(F_2PO)_2$, $LiN(FSO_2)_2$, $LiN(CF_3SO_2)_2$, $LiClO_4$, $LiAsF_6$, $LiSbF_6$, $LiCF_3SO_3$, $LiSO_3F$, $LiN(C_2F_5SO_2)_2$, $LiN(CF_3SO_2)(FSO_2)$, $LiC(CF_3SO_2)_3$, $LiPF_3(C_3F_7)_3$, $LiB(CF_3)_4$, $LiBF_3(C_2F_5)$ and the like (hereinafter, also referred to as "second solute"), and two kinds of lithium salts selected from the compounds Nos. 1 to 18 as the imide anion-containing salt represented by the general formula [1]; and
a combination of one of the first solutes described above, two of the second solutes described above, and one of the imide-anion-containing lithium salts.

More specifically, when the following combinations of four kinds of lithium salts are used, an effect to suppress elevation in internal resistance at a low temperature is large and accordingly such combinations are preferable:
(1) combination of $LiPF_6$, a lithium salt of the compound No. 5, a lithium salt of the compound No. 6, and $LiPF_2(C_2O_4)_2$;

(2) combination of LiPF$_6$, a lithium salt of the compound No. 1, a lithium salt of the compound No. 15, and LiPO$_2$F$_2$;
(3) combination of LiPF$_6$, a lithium salt of the compound No. 1, LiPO$_2$F$_2$, and LiN(F$_2$PO)$_2$; and
(4) combination of LiPF$_6$, a lithium salt of the compound No. 5, LiPF$_2$(C$_2$O$_4$)$_2$, and LiPO$_2$F$_2$.

Any additives other than those described above may also be further contained, as needed.

Alternatively, the total number of the alkali metal salts contained may be five or more. For example, when five kinds of lithium salts are used, the following combinations may be selected:

a combination of one of the first solutes, one of the second solutes, and three kinds of the lithium salts selected from the compounds Nos. 1 to 18;

a combination of one of the first solutes, two selected from the second solutes, and two kinds of the lithium salts selected from the compounds Nos. 1 to 18; and a combination of one of the first solutes, three kinds of the second solutes, and one kind of the lithium salts selected from the compounds Nos. 1 to 18.

More specifically, when the following combinations of five kinds of the lithium salts are used, an effect to suppress an amount of gas generated at high temperatures is further improved, and accordingly such combinations are preferable:

(1) combination of LiPF$_6$, a lithium salt of the compound No. 5, a lithium salt of the compound No. 6, LiPF$_4$(C$_2$O$_4$), and LiPF$_2$(C$_2$O$_4$)$_2$;
(2) combination of LiPF$_6$, a lithium salt of the compound No. 1, LiBF$_2$(C$_2$O$_4$), LiPO$_2$F$_2$, and LiSO$_3$F;
(3) combination of LiPF$_6$, a lithium salt of the compound No. 1, a lithium salt of the compound No. 6, LiN(F$_2$PO)$_2$, and LiPO$_2$F$_2$;
(4) combination of LiPF$_6$, a lithium salt of the compound No. 5, LiPF$_4$(C$_2$O$_4$), LiPF$_2$(C$_2$O$_4$)$_2$, and LiPO$_2$F$_2$; and
(5) combination of LiPF$_6$, a lithium salt of the compound No. 5, LiBF$_2$(C$_2$O$_4$), LiPO$_2$F$_2$, and LiSO$_3$F.

Lithium salts other than those (the additives described above) may also be further contained, as needed.

2. Non-Aqueous Electrolyte Battery

Next, the construction of the non-aqueous electrolyte battery of the present invention will be described below. The non-aqueous electrolyte battery of the present invention is characterized by comprising the electrolyte for a non-aqueous electrolyte battery of the present invention, and also comprises other components generally used in non-aqueous electrolyte batteries, more specifically, a positive electrode and a negative electrode which are capable of occluding and releasing lithium, a collector, a separator, a casing, and the like.

A negative electrode material is not particularly limited, while for a lithium battery and a lithium-ion battery, metal lithium, an alloy of metal lithium and another metal, an intermetallic compound, various kinds of carbon materials (such as artificial graphite and natural graphite), a metal oxide, a metal nitride, tin (elemental substance), a tin compound, silicon (elemental substance), a silicon compound, activated carbon, a conductive polymer and the like are used.

The carbon materials refer to, for example, easily graphitizable carbon, hardly graphitizable carbon (hard carbon) with an interplanar spacing (002) not smaller than 0.37 nm, and graphite with an interplanar spacing (002) not greater than 0.34 nm. Specific examples thereof include pyrolytic carbon, coke, glassy carbon fibers, organic polymer fired materials, activated carbon, carbon blacks and the like.

Among them, coke includes pitch coke, needle coke, petroleum coke and the like. The organic polymer fired materials refer to carbonized phenolic resins, carbonized furan resins and the like, by firing them at an appropriate temperature. The carbon materials are preferable, because they cause only very little change in crystal structure upon occlusion and release of lithium and thereby yield not only high energy density but also excellent cycle characteristic. The shape of the carbon materials may be any one of a fibrous shape, a spherical shape, a granular shape, or a scale-like shape. Amorphous carbon or graphite materials coated with amorphous carbon on the surface are more preferable, because the surface thereof has a low reactivity with an electrolyte.

A positive electrode material is not particularly limited, while, for a lithium battery and a lithium-ion battery, a lithium-containing transition metal composite oxide such as LiCoO$_2$, LiNiO$_2$, LiMnO$_2$, or LiMn$_2$O$_4$, a mixture of such lithium-containing transition metal composite oxides having different transition metals such as Co, Mn, and Ni, a substituted lithium-containing transition metal composite oxide in which part of the transition metal(s) is substituted with a non-transition metal, a phosphoric acid compound of a transition metal called olivine such as LiFePO$_4$, LiCoPO$_4$, or LiMnPO$_4$, an oxide such as TiO$_2$, V$_2$O$_5$, or MoO$_3$, a sulfide such as TiS$_2$ or FeS, a conductive polymer such as a polyacetylene, polyparaphenylene, polyaniline or polypyrrole, activated carbon, a radical-releasing polymer, or a carbon material is used as a positive electrode material.

To the positive electrode material and the negative electrode material, a conductive material such as acetylene black, Ketjenblack, carbon fibers and graphite; and a binding agent such as polytetrafluoroethylene, polyvinylidene fluoride, SBR resin and polyimide may be added and the resultant material may be shaped into a sheet so as to form an electrode sheet.

As a separator for preventing the positive electrode and the negative electrode from coming into contact with each other, a nonwoven fabric or a porous sheet made of polypropylene, polyethylene, paper, glass fibers and the like are used.

The components described above are assembled into a non-aqueous electrolyte battery in a coin shape, a cylindrical shape, a prismatic shape and the like or in a form of an aluminum laminated sheet.

The non-aqueous electrolyte battery may be a non-aqueous electrolyte battery described below comprising (a) the positive electrode, (b) the negative electrode, and (c) the separator, together with the non-aqueous electrolyte as stated above.

[(a) Positive Electrode]

The positive electrode (a) preferably contains at least one oxide and/or polyanion compound as a positive electrode active material.

[Positive Electrode Active Material]

In the case of a lithium-ion secondary battery in which most cations in the non-aqueous electrolyte are lithium, a positive electrode active material constituting the positive electrode (a) is not particularly limited so long as the resultant battery can be charged and discharged. The examples thereof include those containing at least one selected from (A) a lithium-transition metal composite oxide containing at least one or more metals selected from nickel, manganese, and cobalt and having a layered structure, (B) a lithium-manganese composite oxide having a spinel structure, (C) a lithium-containing olivine type phosphoric acid salt, and (D) a lithium-excess layered transition metal oxide having a layered, rock-salt structure.

((A) Lithium-Transition Metal Composite Oxide)

Examples of the positive electrode active material (A), which is a lithium-transition metal composite oxide containing at least one or more metals selected from nickel, manganese and cobalt and having a layered structure, include a lithium-cobalt composite oxide, a lithium-nickel composite oxide, a lithium-nickel-cobalt composite oxide, a lithium-nickel-cobalt-aluminum composite oxide, a lithium-cobalt-manganese composite oxide, a lithium-nickel-manganese composite oxide, and a lithium-nickel-manganese-cobalt composite oxide. A substituted lithium-transition metal composite oxide in which part of the transition metal atom(s), which constitutes the main portion of the lithium-transition metal composite oxide, is substituted with another element such as Al, Ti, V, Cr, Fe, Cu, Zn, Mg, Ga, Zr, Si, B, Ba, Y, or Sn may also be used.

Specific examples of the lithium-cobalt composite oxide and the lithium-nickel composite oxide include $LiCoO_2$, $LiNiO_2$, lithium cobalt oxides (such as $LiCo_{0.98}Mg_{0.01}Zr_{0.01}O_2$, $LiCo_{0.98}Mg_{0.01}Al_{0.01}O_2$, and $LiCo_{0.975}Mg_{0.01}Zr_{0.005}Al_{0.01}O_2$) with a different type of element such as Mg, Zr, Al and Ti added, and lithium cobalt oxides with a rare earth compound fixed to the surface as described in WO2014/034043. $LiCoO_2$ particle powder whose particle surface is partially coated with aluminum oxide as described in, for example, JP Patent Publication (Kokai) No. 2002-151077 A may also be used.

The lithium-nickel-cobalt composite oxide and the lithium-nickel-cobalt-aluminum composite oxide are represented by a general formula (1-1).

$$Li_aNi_{1-b-c}Co_bM^1_cO_2 \quad (1\text{-}1)$$

In the formula (1-1), $M^1$ represents at least one element selected from the group consisting of Al, Fe, Mg, Zr, Ti, and B; a satisfies $0.9 \le a \le 1.2$; and b and c satisfy $0.1 \le b \le 0.3$ and $0 \le c \le 0.1$.

The lithium-nickel-cobalt composite oxide and the lithium-nickel-cobalt-aluminum composite oxide may be prepared by a production method as described in, for example, JP Patent Publication (Kokai) No. 2009-137834 A. Specific examples include $LiNi_{0.8}Co_{0.2}O_2$, $LiNi_{0.85}Co_{0.10}Al_{0.05}O_2$, $LiNi_{0.87}Co_{0.10}Al_{0.03}O_2$, and $LiNi_{0.6}Co_{0.3}Al_{0.1}O_2$.

Specific examples of the lithium-cobalt-manganese composite oxide and the lithium-nickel-manganese composite oxide include $LiNi_{0.5}Mn_{0.5}O_2$ and $LiCo_{0.5}Mn_{0.5}O_2$.

Examples of the lithium-nickel-manganese-cobalt composite oxide include a lithium-containing composite oxide represented by a general formula (1-2).

$$Li_dNi_eMn_fCo_gM^2_hO_2 \quad (1\text{-}2)$$

In the formula (1-2), $M^2$ represents at least one element selected from the group consisting of Al, Fe, Mg, Zr, Ti, B, and Sn; d satisfies $0.9 \le d \le 1.2$; e, f, g, and h satisfy $e+f+g+h=1$, $0 \le e \le 0.7$, $0 \le f \le 0.5$, $0 \le g \le 0.5$, and $h \ge 0$.

The lithium-nickel-manganese-cobalt composite oxide preferably contains manganese in the range specified by the general formula (1-2) for the purpose of enhancing structural stability and improving safety of the resulting lithium secondary battery at a high temperature and more preferably further contains cobalt in the range specified by the general formula (1-2) particularly for the purpose of enhancing a high-rate characteristic of the resulting lithium-ion secondary battery.

Specific examples include those with a charge-discharge region not lower than 4.3 V, such as $Li[Ni_{1/3}Mn_{1/3}Co_{1/3}]O_2$, $Li[Ni_{0.45}Mn_{0.35}Co_{0.2}]O_2$, $Li[Ni_{0.5}Mn_{0.3}Co_{0.02}]O_2$, $Li[Ni_{0.6}Mn_{0.2}Co_{0.2}]O_2$, $Li[Ni_{0.49}Mn_{0.3}Co_{0.2}Zr_{0.01}]O_2$, and $Li[Ni_{0.49}Mn_{0.3}Co_{0.2}Mg_{0.01}]O_2$.

((B) Lithium-Manganese Composite Oxide Having a Spinel Structure)

Examples of the positive electrode active material (B), which is a lithium-manganese composite oxide having a spinel structure, include a spinel lithium-manganese composite oxide represented by a general formula (1-3).

$$Li_j(Mn_{2-k}M^3_k)O_4 \quad (1\text{-}3)$$

In the formula (1-3), $M^3$ represents at least one metal element selected from the group consisting of Ni, Co, Fe, Mg, Cr, Cu, Al, and Ti; j satisfies $1.05 \le j \le 1.15$; and k satisfies $0 \le k \le 0.20$.

Specific examples include $LiMn_2O_4$, $LiMn_{1.95}Al_{0.05}O_4$, $LiMn_{1.9}Al_{0.1}O_4$, $LiMn_{1.9}Ni_{0.1}O_4$, and $LiMn_{1.5}Ni_{0.5}O_4$.

((C) Lithium-Containing Olivine Type Phosphoric Acid Salt)

Examples of the positive electrode active material (C), which is a lithium-containing olivine type phosphoric acid salt, include one represented by a general formula (1-4).

$$LiFe_{1-n}M^4_nPO_4 \quad (1\text{-}4)$$

In the formula (1-4), $M^4$ represents at least one selected from Co, Ni, Mn, Cu, Zn, Nb, Mg, Al, Ti, W, Zr and Cd; and n satisfies $0 \le n \le 1$.

Specific examples include $LiFePO_4$, $LiCoPO_4$, $LiNiPO_4$ and $LiMnPO_4$, and among them, $LiFePO_4$ and/or $LiMnPO_4$ is preferable.

((D) Lithium-Excess Layered Transition Metal Oxide)

Examples of the positive electrode active material (D), which is a lithium-excess layered transition metal oxide having a layered, rock-salt structure, include one represented by a general formula (1-5).

$$xLiM^5O_2 \cdot (1-x)Li_2M^6O_3 \quad (1\text{-}5)$$

In the formula (1-5), x is a numerical value satisfying $0<x<1$; $M^5$ represents at least one or more metal elements having an average oxidation number of $3^+$; and $M^6$ represents at least one metal element having an average oxidation number of $4^+$. In the formula (1-5), $M^5$ is preferably one trivalent metal element selected from Mn, Ni, Co, Fe, V and Cr, while a trivalent metal element having an average oxidation number of 3 produced by using equal amounts of a divalent metal and a tetravalent metal may be also used.

In the formula (1-5), $M^6$ is preferably one or more metal elements selected from Mn, Zr and Ti. Specific examples include $0.5[LiNi_{0.5}Mn_{0.5}O_2] \cdot 0.5[Li_2MnO_3]$, $0.5[LiNi_{1/3}Co_{1/3}Mn_{1/3}O_2] \cdot 0.05[Li_2MnO_3]$, $0.5[LiNi_{0.375}Co_{0.25}Mn_{0.375}O_2] \cdot 0.5[Li_2MnO_3]$, $0.5[LiNi_{0.375}Co_{0.125}Fe_{0.125}Mn_{0.375}O_2] \cdot 0.5[Li_2MnO_3]$, and $0.45[LiNi_{0.375}Co_{0.25}Mn_{0.375}O_2] \cdot 0.10[Li_2TiO_3] \cdot 0.45[Li_2MnO_3]$.

This positive electrode active material (D) represented by the general formula (1-5) is known to exhibit a high capacity after high voltage charging at 4.4 V or higher (in terms of Li) (for example, see the specification of U.S. Pat. No. 7,135,252).

These positive electrode active materials may be prepared by, for example, the production methods as disclosed in JP Patent Publication (Kokai) No. 2008-270201 A, WO2013/118661, JP Patent Publication (Kokai) No. 2013-030284 A, and the like.

It is sufficient that the positive electrode active material contains at least one selected from (A) to (D) described above as a main component, and further contains a chalcogenide of a transition element, such as $FeS_2$, $TiS_2$, $V_2O_5$, MoO$_3$ or MoS$_2$, a conductive polymer such as polyacetylene, polyparaphenylene, polyaniline, or polypyrrole, activated carbon, a radical-releasing polymer, a carbon material and the like.

[Positive Electrode Collector]

The positive electrode (a) has a positive electrode collector. As the positive electrode collector, for example, aluminum, stainless steel, nickel, titanium, or an alloy of these may be used.

[Positive Electrode Active Material Layer]

For example, the positive electrode (a) has a positive electrode active material layer formed on at least one side of the positive electrode collector. The positive electrode active material layer is composed of, for example, the positive electrode active material described above and a binding agent and, as needed, a conducting agent.

Examples of the binding agent include polytetrafluoroethylene, polyvinylidene fluoride and styrene-butadiene rubber (SBR) resin.

As the conducting agent, for example, a carbon material such as acetylene black, Ketjenblack, carbon fibers, or graphite (granular graphite or flake graphite) may be used. Acetylene black or Ketjenblack, either of which has a low crystallinity, is preferably used in the positive electrode.

[(b) Negative Electrode]

The negative electrode (b) preferably contains at least one negative electrode active material.

[Negative Electrode Active Material]

In the case of a lithium-ion secondary battery, in which most cations in the non-aqueous electrolyte are lithium, a negative electrode active material constituting the negative electrode (b) is a negative electrode active material capable of lithium ion doping and undoping and containing at least one selected from (E) a carbon material with a d-value at a lattice plane (002) in X-ray diffraction not greater than 0.340 nm, (F) a carbon material with a d-value at a lattice plane (002) in X-ray diffraction greater than 0.340 nm, (G) an oxide of one or more metals selected from Si, Sn and Al, (H) one or more metals selected from Si, Sn, and Al, an alloy containing such a metal or metals, or an alloy of such a metal or metals or of such an alloy with lithium, and (I) a lithium titanium oxide. The negative electrode active materials may be used alone, or two or more of them may be used in combination.

((E) Carbon Material with d-Value at Lattice Plane (002) in X-Ray Diffraction not Greater than 0.340 nm)

Examples of the negative electrode active material (E), which is a carbon material with a d-value at a lattice plane (002) in X-ray diffraction not greater than 0.340 nm, include pyrolytic carbons, coke (such as pitch coke, needle coke, and petroleum coke), graphite, organic polymer fired materials (such as carbonized phenolic resins and carbonized furan resins obtained by firing phenolic resins and furan resins at an appropriate temperature), carbon fibers, and activated carbon, and these carbon materials may be in a graphitized form. These carbon materials have an interplanar spacing (d002) at (002) not greater than 0.340 nm measured by X-ray diffraction. Among these carbon materials, graphite with a true density not lower than 1.70 g/cm$^3$ or a highly crystalline carbon material having similar characteristics is preferable.

((F) Carbon Material with a d-Value at Lattice Plane (002) in X-Ray Diffraction Greater than 0.340 nm)

Examples of the negative electrode active material (F), which is a carbon material with a d-value at a lattice plane (002) in X-ray diffraction greater than 0.340 nm, include amorphous carbon, which is the carbon material which causes almost no change in the order of lamination upon heat treatment at a high temperature not lower than 2000° C. Examples thereof include hardly graphitizable carbon (hard carbon), meso-carbon microbeads (MCMB) obtained by firing at a temperature not higher than 1500° C., and mesophase pitch carbon fibers (MCF). A typical example thereof is, for example, Carbotron (registered trademark) P manufactured by Kureha Corporation.

((G) Oxide of One or More Metals Selected from Si, Sn and Al)

Examples of the negative electrode active material (G), which is the oxide of one or more metals selected from Si, Sn and Al, include silicon oxide and tin oxide, which are capable of lithium ion doping and undoping.

For example, there is SiO$_x$ having a structure wherein ultrafine Si particles are dispersed in SiO$_2$. When this material is used as the negative electrode active material, Si, which reacts with Li, is in a form of ultrafine particles and thereby charge and discharge proceed smoothly, and SiO$_x$ particles by themselves have a small surface area and accordingly when the SiO$_x$ particles are used in a composition (paste) for use in formation of a negative electrode active material layer, an excellent paint property and an excellent adhesion to a collector in the layer of mixed negative electrodes can be obtained.

In this connection, SiO$_x$ greatly changes its volume upon charge and discharge and therefore, by using SiO$_x$ in combination with graphite, which is the negative electrode active material (E) described above, at a particular ratio as the negative electrode active material, a high capacity and an excellent charge-discharge cycle characteristic may be both obtained.

((H) One or More Metals Selected from Si, Sn and Al, Alloy Containing Such Metal or Metals, or Alloy of Such Metal or Metals or of Such Alloy with Lithium)

Examples of the negative electrode active material (H), which is one or more metals selected from Si, Sn and Al, an alloy containing such a metal or metals, or an alloy of such a metal or metals or of such an alloy with lithium, include metals such as silicon, tin, and aluminum, silicon alloys, tin alloys, and aluminum alloys. Materials which are formed as lithium alloys of these metals and these alloys during charge and discharge may also be used.

Specific, preferable examples thereof include those described in, for example, WO2004/100293 and JP Patent Publication (Kokai) No. 2008-016424 A, for example, including metal elemental substances such as silicon (Si) and tin (Sn) (for example, those in a powder form), alloys of these metals, compounds containing these metals, and alloys containing these metals as well as tin (Sn) and cobalt (Co). Use of such metals in an electrode is preferable, because these metals are capable of achieving a large charging capacity and are subjected to a relatively small level of expansion and shrinkage in volume upon charge and discharge. Use of such metals in a negative electrode of a lithium-ion secondary battery is also preferable, because these metals are known to form an alloy with Li during charging to achieve a large charging capacity.

Further, for example, a negative electrode active material made of a silicon pillar with a submicron-scale diameter or a negative electrode active material made of fibers composed of silicon, as described in publications such as WO2004/042851 and WO02007/083155 may also be used.

((I) Lithium Titanium Oxide)

Examples of the negative electrode active material (I), which is a lithium titanium oxide, include lithium titanate having a spinel structure and lithium titanate having a ramsdellite structure.

Examples of the lithium titanate having a spinel structure include $Li_{4+\alpha}Ti_5O_{12}$ ($\alpha$ varies within the range of $0 \leq \alpha \leq 3$ during charge-discharge reaction). Examples of the lithium titanate having a ramsdellite structure include $Li_{2+\beta}Ti_3O_7$ ($\beta$ varies within the range of $0 \leq \beta \leq 3$ during charge-discharge reaction). These negative electrode active materials may be prepared by, for example, a method of production described in JP Patent Publication (Kokai) No. 2007-018883 A, JP Patent Publication (Kokai) No. 2009-176752 A, and the like.

For example, in the case of a sodium-ion secondary battery, wherein most cations in the non-aqueous electrolyte are sodium, hard carbon or an oxide such as $TiO_2$, $V_2O_5$ or $MoO_3$ is used as a negative electrode active material. For example, in the case of a sodium-ion secondary battery, wherein most cations in the non-aqueous electrolyte are sodium, a sodium-containing transition metal composite oxide such as $NaFeO_2$, $NaCrO_2$, $NaNiO_2$, $NaMnO_2$ or $NaCoO_2$, a mixture of such sodium-containing transition metal composite oxides containing different transition metals such as Fe, Cr, Ni, Mn and Co, a substituted sodium-containing transition metal composite oxide in which part of the transition metal(s) is substituted with a non-transition metal, a phosphoric acid compound of a transition metal such as $Na_2FeP_2O_7$ or $NaCo_3(PO_4)_2P_2O_7$, a sulfide such as $TiS_2$ or $FeS_2$, a conductive polymer such as polyacetylene, polyparaphenylene, polyaniline, or polypyrrole, activated carbon, a radical-releasing polymer, or a carbon material is used, for example, as a positive electrode active material.

[Negative Electrode Collector]

The negative electrode (b) has a negative electrode collector. As the negative electrode collector, for example, copper, aluminum, stainless steel, nickel, titanium, or an alloy of these may be used.

[Negative Electrode Active Material Layer]

For example, the negative electrode (b) has a negative electrode active material layer formed on at least one side of the negative electrode collector. The negative electrode active material layer is composed of the negative electrode active material described above and a binding agent and, as needed, a conducting agent, for example.

Examples of the binding agent include polytetrafluoroethylene, polyvinylidene fluoride and styrene-butadiene rubber (SBR) resin.

As the conducting agent, a carbon material such as acetylene black, Ketjenblack, carbon fibers or graphite (granular graphite or flake graphite) may be used.

[Method of Producing Electrode (Positive Electrode (a) and Negative Electrode (b))]

An electrode may be obtained by, for example, dispersing predetermined amounts of an active material and a binding agent and, as needed, a conducting agent in a solvent such as N-methyl-2-pyrrolidone (NMP) or water with kneading, then applying the resulting paste to the collector, and drying it to form an active material layer. The resulting electrode is preferably compressed by a technique such as roll press to appropriately adjust the density of the electrode.

[(c) Separator]

The non-aqueous electrolyte battery described above has the separator (c). As the separator for preventing the positive electrode (a) and the negative electrode (b) from coming into contact with each other, a nonwoven fabric or a porous sheet made of a polyolefin such as polypropylene or polyethylene, cellulose, paper, or glass fibers is used. The resulting film is preferably made into a microporous film so that the electrolyte easily soak into the film and ions easily permeate the film.

Examples of the polyolefin separator include a membrane that electrically insulates the positive electrode from the negative electrode and into which lithium ions are capable of permeating, such as a microporous polymer film including a porous polyolefin film. More specifically, the porous polyolefin film may be, for example, a porous polyethylene film by itself or a multilayer film made of a stack of a porous polyethylene film and a porous polypropylene film. A composite film made of a porous polyethylene film and a polypropylene film is also used.

[Case]

In assembling the non-aqueous electrolyte battery, a metal can such as a coin-shaped can, a cylindrical can, or a square can or a laminated case, for example, may be used as a case for the non-aqueous electrolyte battery. Examples of the material of the metal can include a nickel plated iron steel plate, a stainless steel plate, a nickel plated stainless steel plate, aluminum or alloys thereof, nickel, and titanium.

As the laminated case, an aluminum-laminated film, an SUS laminated film, or a silica-coated laminated film made of polypropylene, polyethylene, and the like may be used.

The construction of the non-aqueous electrolyte battery according to embodiments of the present invention is not particularly limited, while the examples thereof may include a construction wherein an electrode element composed of the positive electrode and the negative electrode positioned facing each other and the non-aqueous electrolyte are enclosed within the case. The shape of the non-aqueous electrolyte battery is not particularly limited, and the components described above are assembled into an electrochemical device in a shape such as a coin shape, a cylindrical shape, and a square shape and also an aluminum laminated sheet.

EXAMPLES

The present invention will be further described in more detail with reference to examples. The scope of the present invention is not limited by these examples at all.

Example 1-1

The conditions for preparation of non-aqueous electrolytes are shown in Table 1, and the evaluation results of the resultant batteries containing the electrolyte are shown in Table 2. In Table 2, the values of the internal resistance characteristics of the batteries at −30° C. and the values of the amounts of gas generated are those relative values as compared with the internal resistance after a charge-discharge cycle test and the amount of gas generated associated with a charge-discharge cycle test, of a laminated cell assembled using an electrolyte No. A-35, respectively, designated as 100.

Using a mixed solvent of ethylene carbonate, dimethyl carbonate and ethyl methyl carbonate as a non-aqueous solvent in a volume ratio of 3:3:4 was used and in order to achieve a concentration of $LiPF_6$ as a solute at 1.0 mol/L in the solvent, a lithium salt of the compound No. 1 as an imide anion-containing salt (the Cl content of the imide anion-containing salt, as a raw material, before being dissolved in the electrolyte was 50 ppm by mass) was dissolved at a concentration of 1.0 mass % relative to the total amount of the non-aqueous solvent, the solute, and the imide anion-containing salt, so as to form an electrolyte No. A-1 for use in a non-aqueous electrolyte battery. The above preparation was carried out while the liquid temperature was maintained within the range from 20 to 30° C. In the electrolyte, the concentration of the total amount of the compounds represented by the general formulae [2] to [5] was lower than 5 ppm by mass and the concentration of free acid was 45 ppm by mass.

A cell was assembled using the electrolyte, using $LiNi_{1/3}Co_{1/3}Mn_{1/3}O_2$ as a positive electrode material, and using graphite as a negative electrode material, and then was actually evaluated for a cycle characteristic and an internal resistance characteristic thereof. The test cell was prepared as follows.

$LiNi_{1/3}Co_{1/3}Mn_{1/3}O_2$ powder (90 mass %) was mixed with 5 mass % of polyvinylidene fluoride (hereinafter, referred to as "PVDF") as a binder and 5 mass % of acetylene black as a conductive material. N-methylpyrrolidone was further added to the resultant mixture and then prepared into a paste. The paste was applied onto an aluminum foil, and then the foil was dried, thereby preparing a test positive electrode.

On the other hand, graphite powder (90 mass %) was mixed with 10 mass % of PVDF as a binder and then N-methylpyrrolidone was further added thereto to form a slurry. The slurry was applied onto a copper foil, and then the foil was dried at 120° C. for 12 hours, thereby obtaining a test negative electrode.

A polyethylene separator was impregnated with the electrolyte, and assembled into a 50 mAh cell cased with an aluminum laminate.

[Evaluation of Internal Resistance Characteristics (−30° C.)]

A charge and discharge test at an ambient temperature of 70° C. was conducted using the cell thus prepared. Charging and discharging were performed at a current density of 3.5 mA/cm². Charging was performed to 4.3 V and then maintained at 4.3 V for 1 hour. Discharging was performed to 3.0 V. This charge and discharge cycle was repeated. After 300 cycles, the cell was charged to 4.3 V at an ambient temperature of 25° C. and a current density of 0.35 mA/cm², and measured for an internal resistance of the battery at an ambient temperature of −30° C.

[Evaluation of an Amount of Gas Generated]

The amount of gas generated was evaluated by employing the Archimedes' method with the use of silicon oil to estimate the increment of the volume of a cell before and after the cycle test at 70° C.

TABLE 1

| Electrolytic solution No. | Imide anion-containing salt | | | Solute | | Concentration of total amount of compounds represented by general formulae [2] to [5]* (ppm by mass) |
|---|---|---|---|---|---|---|
| | Anion compound No. | Counter cation | Concentration [mass %] | Compound | Concentration [mol/L] | |
| A-1 | 1 | $Li^+$ | 1 | $LiPF_8$ | 1 | <1 |
| A-2 | 1 | $Li^+$ | 0.1 | $LiPF_8$ | 1 | <1 |
| A-3 | 1 | $Li^+$ | 0.01 | $LiPF_8$ | 1 | <1 |
| A-4 | 1 | $Li^+$ | 5 | $LiPF_8$ | 1 | 1 |
| A-5 | 1 | $Li^+$ | 10 | $LiPF_8$ | 1 | 2 |
| A-6 | 1 | $Li^+$ | 1 | $LiPF_8$ | 0.5 | 3 |
| A-7 | 1 | $Li^+$ | 1 | $LiPF_8$ | 1.5 | 2 |
| A-8 | 1 | $Li^+$ | 1 | $LiPF_8$ | 2.5 | 2 |
| A-9 | 2 | $Li^+$ | 1 | $LiPF_8$ | 1 | 1 |
| A-10 | 3 | $Li^+$ | 1 | $LiPF_8$ | 1 | 1 |
| A-11 | 4 | $Li^+$ | 1 | $LiPF_8$ | 1 | 2 |
| A-12 | 5 | $Li^+$ | 1 | $LiPF_8$ | 1 | 3 |
| A-13 | 6 | $Li^+$ | 0.01 | $LiPF_8$ | 1 | <1 |
| A-14 | 6 | $Li^+$ | 0.1 | $LiPF_8$ | 1 | <1 |
| A-15 | 6 | $Li^+$ | 1 | $LiPF_6$ | 1 | 1 |
| A-16 | 6 | $Li^+$ | 5 | $LiPF_6$ | 1 | 3 |
| A-17 | 6 | $Li^+$ | 10 | $LiPF_6$ | 1 | 4 |
| A-18 | 7 | $Li^+$ | 1 | $LiPF_6$ | 1 | 1 |
| A-19 | 8 | $Li^+$ | 1 | $LiPF_6$ | 1 | 3 |
| A-20 | 9 | $Li^+$ | 1 | $LiPF_6$ | 1 | 2 |
| A-21 | 10 | $Li^+$ | 1 | $LiPF_6$ | 1 | 3 |
| A-22 | 11 | $Li^+$ | 1 | $LiPF_8$ | 1 | <1 |
| A-23 | 12 | $Li^+$ | 1 | $LiPF_6$ | 1 | <1 |
| A-24 | 13 | $Li^+$ | 1 | $LiPF_8$ | 1 | 2 |
| A-25 | 14 | $Li^+$ | 1 | $LiPF_6$ | 1 | 3 |
| A-26 | 15 | $Li^+$ | 1 | $LiPF_8$ | 1 | 2 |
| A-27 | 16 | $Li^+$ | 1 | $LiPF_6$ | 1 | 3 |
| A-28 | 17 | $Li^+$ | 1 | $LiPF_6$ | 1 | 3 |
| A-29 | 18 | $Li^+$ | 1 | $LiPF_6$ | 1 | 4 |
| A-30 | 1 | $Li^+$ | 1 | $LiPF_4$ | 1 | <1 |
| A-31 | 5 | $Li^+$ | 1 | $LiPF_4$ | 1 | 4 |
| A-32 | 1 | $Na^+$ | 1 | $LiPF_6$ | 1 | <1 |
| A-33 | 1 | $K^+$ | 1 | $LiPF_8$ | 1 | <1 |
| A-34 | 1 | $(C_2H_5)_4N^+$ | 1 | $LiPF_6$ | 1 | <1 |
| A-35 | — | — | — | $LiPF_8$ | 1 | <1 |
| A-36 | — | — | — | $LiPF_4$ | 1 | <1 |
| A-37 | 1 | $Li^+$ | 10 | — | — | 1 |
| A-38 | 19 | $Li^+$ | 1 | $LiPF_6$ | 1 | 1 |
| A-39 | 20 | $Li^+$ | 1 | $LiPF_6$ | 1 | 2 |
| A-40 | 21 | $Li^+$ | 1 | $LiPF_6$ | 1 | 1 |
| A-41 | 22 | $Li^+$ | 1 | $LiPF_6$ | 1 | 2 |

TABLE 1-continued

| Electrolytic solution No. | Imide anion-containing salt | | | Solute | | Concentration of total amount of compounds represented by general formulae [2] to [5]* (ppm by mass) |
|---|---|---|---|---|---|---|
| | Anion compound No. | Counter cation | Concentration [mass %] | Compound | Concentration [mol/L] | |
| A-42 | 23 | Li⁺ | 1 | LiPF₆ | 1 | 3 |
| A-43 | 24 | Li⁺ | 1 | LiPF₆ | 1 | 2 |
| A-44 | 1 | Li⁺ | 1 | LiPF₆ | 1 | Tetravinylsilane 0.5 mass % |
| A-45 | 1 | Li⁺ | 1 | LiPF₈ | 1 | [structure] 0.5 mass % |

Mass % for electrolytes Nos. A-44 and A-45

Examples 1-2 to 1-34

Non-aqueous electrolytes Nos. A-2 to A-34 were prepared and evaluated in the same manner as in Example 1-1 except that the conditions for preparation of non-aqueous electrolytes shown in Table 1 were adopted. The results of evaluation of the resultant batteries containing the electrolytes are shown in Table 2. The Cl content of each imide anion-containing salt used in the examples was not higher than 200 ppm by mass. The concentration of free acid in each electrolyte used in the examples was not higher than 100 ppm by mass. In Table 2, the values of the internal resistance characteristic of the batteries at −30° C. and the values of the amount of gas generated are relative values relative to the internal resistance after the cycle test and the amount of gas generated associated with the cycle test, of a laminated cell assembled using the electrolyte No. A-35, respectively, designated as 100.

Comparative Examples 1-1 to 1-3, Reference Examples 1-1 and 1-2

Non-aqueous electrolytes Nos. A-35 to A-37, A-44, and A-45 were prepared and evaluated in the same manner as in Example 1-1 except that the conditions for preparation of non-aqueous electrolytes shown in Table 1 were adopted. Each of Comparative Examples 1-1 to 1-3 is an experimental example related to an electrolyte that does not contain an imide anion-containing salt or that does not contain a solute. Reference Example 1-1 is an experimental example related to an electrolyte containing a compound represented by the general formula [2], and Reference Example 1-2 is an experimental example related to an electrolyte containing a compound represented by the general formula [5]. The results of evaluation of the batteries containing the electrolytes are shown in Table 2. In Table 2, the values of the internal resistance characteristic of the batteries at −30° C. and the values of the amount of gas generated are relative values relative to the internal resistance after the cycle test and the amount of gas generated associated with the cycle test, of a laminated cell assembled using the electrolyte No. A-35, respectively, designated as 100.

TABLE 2

| | Electrolytic solution No. | Positive electrode active material | Negative electrode active material | Internal resistance* [%] | Amount of gas generated* [%] |
|---|---|---|---|---|---|
| Ex. 1-1 | A-1 | LiNi₁/₃Co₁/₃Mn₁/₃O₂ | Graphite | 61 | 48 |
| Ex. 1-2 | A-2 | | | 70 | 65 |
| Ex. 1-3 | A-3 | | | 94 | 89 |
| Ex. 1-4 | A-4 | | | 83 | 24 |
| Ex. 1-5 | A-5 | | | 92 | 51 |
| Ex. 1-6 | A-6 | | | 74 | 69 |
| Ex. 1-7 | A-7 | | | 82 | 71 |
| Ex. 1-8 | A-8 | | | 96 | 83 |
| Ex. 1-9 | A-9 | | | 70 | 52 |
| Ex. 1-10 | A-10 | | | 83 | 55 |
| Ex. 1-11 | A-11 | | | 90 | 73 |
| Ex. 1-12 | A-12 | | | 77 | 54 |
| Ex. 1-13 | A-13 | | | 96 | 92 |
| Ex. 1-14 | A-14 | | | 73 | 69 |
| Ex. 1-15 | A-15 | | | 63 | 52 |
| Ex. 1-16 | A-16 | | | 88 | 27 |
| Ex. 1-17 | A-17 | | | 95 | 55 |
| Ex. 1-18 | A-18 | | | 69 | 57 |
| Ex. 1-19 | A-19 | | | 71 | 59 |

TABLE 2-continued

|  | Electrolytic solution No. | Positive electrode active material | Negative electrode active material | Internal resistance* [%] | Amount of gas generated* [%] |
|---|---|---|---|---|---|
| Ex. 1-20 | A-20 | | | 75 | 59 |
| Ex. 1-21 | A-21 | | | 67 | 53 |
| Ex. 1-22 | A-22 | | | 79 | 60 |
| Ex. 1-23 | A-23 | | | 77 | 62 |
| Ex. 1-24 | A-24 | | | 76 | 60 |
| Ex. 1-25 | A-25 | | | 81 | 65 |
| Ex. 1-26 | A-26 | | | 72 | 59 |
| Ex. 1-27 | A-27 | | | 77 | 61 |
| Ex. 1-28 | A-28 | | | 91 | 89 |
| Ex. 1-29 | A-29 | | | 93 | 92 |
| Ex. 1-30 | A-30 | | | 68 | 55 |
| Ex. 1-31 | A-31 | | | 71 | 61 |
| Ex. 1-32 | A-32 | | | 62 | 48 |
| Ex. 1-33 | A-33 | | | 64 | 49 |
| Ex. 1-34 | A-34 | | | 64 | 48 |
| Comp. Ex. 1-1 | A-35 | | | 100 | 100 |
| Comp. Ex. 1-2 | A-36 | | | 105 | 108 |
| Comp. Ex. 1-3 | A-37 | | | 142 | 121 |
| Ref. Ex. 1-1 | A-44 | | | 65 | 38 |
| Ref. Ex. 1-2 | A-45 | | | 59 | 46 |

(*The relative value, relative to the value of Comparative Example 1-1 designated as 100)

Comparative Examples 1-4 and 1-5

Non-aqueous electrolytes Nos. A-38 and A-39 were prepared and evaluated in the same manner as in Example 1-1 except that the conditions for preparation of non-aqueous electrolytes shown in Table 1 were adopted. Each of Comparative Examples 1-4 and 1-5 is an experimental example related to an electrolyte containing a lithium salt of the following compound No. 19 or No. 20, respectively, as an imide anion-containing salt. The Cl contents of the imide anion-containing salts used in Comparative Examples 1-4 and 1-5 were 90 ppm by mass and 20 ppm by mass, respectively. The concentrations of free acid in the electrolytes used in Comparative Examples 1-4 and 1-5 were 42 ppm by mass and 40 ppm by mass, respectively. The results of evaluation of the resultant batteries containing the electrolytes are shown in Table 3. In Table 3, the values of the internal resistance characteristic of the batteries at −30° C. and the values of the amount of gas generated are relative values relative to the internal resistance after the cycle test and the amount of gas generated associated with the cycle test of a laminated cell assembled using the electrolyte No. A-35 (Comparative Example 1-1), respectively, designated as 100.

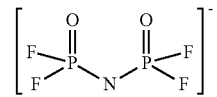

Compound No. 19

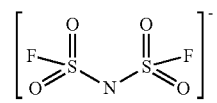

Compound No. 20

TABLE 3

|  | Electrolytic solution No. | Positive electrode active material | Negative electrode active material | Internal resistance* [%] | Amount of gas generated* [%] |
|---|---|---|---|---|---|
| Ex. 1-1 | A-1 | $LiNi_{1/3}Co_{1/3}Mn_{1/3}O_2$ | Graphite | 61 | 48 |
| Comp. Ex. 1-4 | A-38 | | | 89 | 96 |
| Comp. Ex. 1-5 | A-39 | | | 95 | 102 |

(*The relative value, relative to the value of Comparative Example 1-1 designated as 100)

Comparative Example 1-6

A non-aqueous electrolyte No. A-40 was prepared and evaluated in the same manner as in Example 1-1 except that the conditions for preparation of non-aqueous electrolytes shown in Table 1 were adopted. Comparative Example 1-6 is an experimental example related to an electrolyte containing a lithium salt of the following compound No. 21 as an imide anion-containing salt. The Cl content of the imide anion-containing salt used in Comparative Example 1-6 was 5 ppm by mass. The concentration of free acid in the electrolyte used in Comparative Example 1-6 was 37 ppm by mass. The results of evaluation of a battery containing the electrolyte are shown in Table 4. In Table 4, the value of the internal resistance characteristic of the battery at −30° C. and the value of the amount of gas generated are relative values relative to the internal resistance after the cycle test and the amount of gas generated associated with the cycle test of a laminated cell assembled using the electrolyte No. A-35 (Comparative Example 1-1), respectively, designated as 100.

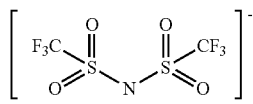

Compound No. 21

TABLE 4

| Electrolytic solution No. | Positive electrode active material | Negative electrode active material | Internal resistance* [%] | Amount of gas generated* [%] |
|---|---|---|---|---|
| Ex. 1-15 | A-15 | $LiNi_{1/3}Co_{1/3}Mn_{1/3}O_2$ | Graphite | 63 | 52 |
| Comp. Ex. 1-6 | A-40 | | | 101 | 101 |

(*The relative value, relative to the value of Comparative Example 1-1 designated as 100)

Comparative Example 1-7

A non-aqueous electrolyte No. A-41 was prepared and evaluated in the same manner as in Example 1-1 except that the conditions for preparation of non-aqueous electrolytes shown in Table 1 were adopted. Comparative Example 1-7 is an experimental example related to an electrolyte containing a lithium salt of the following compound No. 22 as an imide anion-containing salt. The Cl content of the imide anion-containing salt used in Comparative Example 1-7 was 60 ppm by mass. The concentration of free acid in the electrolyte used in Comparative Example 1-7 was 46 ppm by mass. The results of evaluation of the battery containing the electrolyte are shown in Table 5. In Table 5, the value of the internal resistance characteristic of the battery at −30° C. and the value of the amount of gas generated are relative values relative to the internal resistance after the cycle test and the amount of gas generated associated with the cycle test of a laminated cell assembled using the electrolyte No. A-35 (Comparative Example 1-1), respectively, designated as 100.

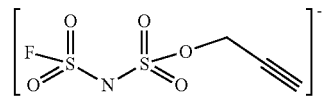

Compound No. 22

TABLE 5

| Electrolytic solution No. | Positive electrode active material | Negative electrode active material | Internal resistance* [%] | Amount of gas generated* [%] |
|---|---|---|---|---|
| Ex. 1-21 | A-21 | $LiNi_{1/3}Co_{1/3}Mn_{1/3}O_2$ | Graphite | 67 | 53 |
| Ex. 1-26 | A-26 | | | 72 | 59 |
| Comp. Ex. 1-7 | A-41 | | | 92 | 90 |

(*The relative value, relative to the value of Comparative Example 1-1 designated as 100)

Comparative Example 1-8

A non-aqueous electrolyte No. A-42 was prepared and evaluated in the same manner as in Example 1-1 except that the conditions for preparation of non-aqueous electrolytes shown in Table 1 were adopted. Comparative Example 1-8 is an experimental example related to an electrolyte containing a lithium salt of the following compound No. 23 as an imide anion-containing salt. The Cl content of the imide anion-containing salt used in Comparative Example 1-8 was 110 ppm by mass. The concentration of free acid in the electrolyte used in Comparative Example 1-8 was 36 ppm by mass. The results of evaluation of a battery containing the electrolyte are shown in Table 6. In Table 6, the value of internal resistance characteristics of the battery at −30° C. and the value of the amount of gas generated are relative values relative to the internal resistance after the cycle test and the amount of gas generated associated with the cycle test of a laminated cell assembled using the electrolyte No. A-35 (Comparative Example 1-1), respectively, designated as 100.

Compound No. 23

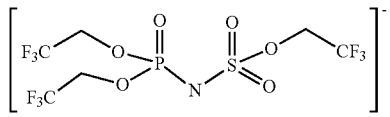

TABLE 6

| | Electrolytic solution No. | Positive electrode active material | Negative electrode active material | Internal resistance* [%] | Amount of gas generated* [%] |
|---|---|---|---|---|---|
| Ex. 1-23 | A-23 | LiNi$_{1/3}$Co$_{1/3}$Mn$_{1/3}$O$_2$ | Graphite | 77 | 62 |
| Ex. 1-29 | A-29 | | | 93 | 92 |
| Comp. Ex. 1-8 | A-42 | | | 112 | 101 |

(*The relative value, relative to the value of Comparative Example 1-1 designated as 100)

Comparative Example 1-9

A non-aqueous electrolyte No. A-43 was prepared and evaluated in the same manner as in Example 1-1 except that the conditions for preparation of non-aqueous electrolytes shown in Table 1 were adopted. Comparative Example 1-9 is an experimental example related to an electrolyte containing a lithium salt of the following compound No. 24 as an imide anion-containing salt. The Cl content of the imide anion-containing salt used in Comparative Example 1-9 was 20 ppm by mass. The concentration of free acid in the electrolyte used in Comparative Example 1-9 was 39 ppm by mass. The results of evaluation of a battery containing the electrolyte are shown in Table 7. In Table 7, the value of internal resistance characteristics of the battery at −30° C. and the value of the amount of gas generated are relative values relative to the internal resistance after the cycle test and the amount of gas generated associated with the cycle test of a laminated cell assembled using the electrolyte No. A-35 (Comparative Example 1-1), respectively, designated as 100.

Compound No. 24

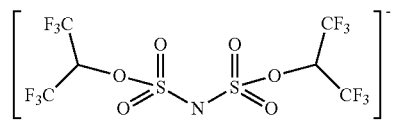

TABLE 7

| | Electrolytic solution No. | Positive electrode active material | Negative electrode active material | Internal resistance* [%] | Amount of gas generated* [%] |
|---|---|---|---|---|---|
| Ex. 1-22 | A-22 | LiNi$_{1/3}$Co$_{1/3}$Mn$_{1/3}$O$_2$ | Graphite | 79 | 60 |
| Comp. Ex. 1-9 | A-43 | | | 96 | 97 |

(*The relative value, relative to the value of Comparative Example 1-1 designated as 100)

The results in Table 2 show that in the case wherein a hexafluorophosphate and/or tetrafluoroborate is contained and the imide anion-containing salt represented by the general formula [1] is contained, an excellent internal resistance characteristic is exhibited and the amount of gas generated after the cycle is suppressed. In the case wherein the imide anion-containing salt of the present invention is not contained (Comparative Examples 1-1 and 1-2) and in the case wherein the imide anion-containing salt of the present invention is contained but a hexafluorophosphate and/or tetrafluoroborate is not contained (Comparative Example 1-3), an internal resistance is relatively high and the amount of gas generated is also relatively high. In contrast, in the case wherein both of the imide anion-containing salt of the present invention and a hexafluorophosphate and/or tetrafluoroborate are contained, an excellent internal resistance characteristic and an excellent effect to suppress the amount of gas generated were obtained.

In addition, the results in Tables 3 to 7 show that, when comparison is made between the imide anion-containing salts having the same type of substituents, wherein an imide anion-containing salt containing a phosphorus atom alone or a sulfur atom alone was used (Comparative Examples 1-4 to 1-7 and 1-9) and wherein an imide anion-containing salt containing neither a P—F bond nor an S—F bond was used (Comparative Examples 1-6, 1-8, and 1-9), the internal resistance characteristic was relatively high and the amount of gas generated was also relatively high. On the other hand, when the imide anion-containing salt of the present invention was contained, an excellent internal resistance characteristic and an excellent effect to suppress the amount of gas generated were obtained.

Examples 2-1 to 2-47, Comparative Examples 2-1 to 2-30

Experimental Example 1 Wherein Additional Solute and Additive were Added

Non-aqueous electrolytes Nos. B-1 to B-77 were prepared and evaluated in the same manner as in Example 1-1 except that the conditions for preparation of non-aqueous electrolytes shown in Table 8 were adopted. As for the electrolyte, each electrolyte contains 1.0 mol/L of $LiPF_6$ as a solute and the concentration of the total amount of the compounds represented by the general formulae [2] to [5] is lower than 5 ppm by mass. The concentration of free acid in each electrolyte used in examples was not higher than 120 ppm by mass.

The results of evaluation of the resultant batteries containing the electrolytes are shown in Table 9. In Table 9, the values of internal resistance characteristics of the batteries at −30° C. and the values of the amount of gas generated are relative values relative to the internal resistance after the cycle test and the amount of gas generated associated with the cycle test of a laminated cell assembled using an electrolyte that does not contain the imide anion-containing salt of the present invention, respectively, designated as 100.

TABLE 8

| Electrolytic solution No. | Imide anion-containing salt | | | Additional solute and additive | | Concentration of total amount of compounds represented by general formulae [2] to [5] (ppm by mass) |
|---|---|---|---|---|---|---|
| | Anion compound No. | Counter cation | Concentration [mass %] | Compound | Concentration [mass %] | |
| B-1 | 1 | Li$^+$ | 1 | $LiPF_2(C_2O_4)_2$ | 1 | <1 |
| B-2 | 5 | Li$^+$ | 1 | $LiPF_2(C_2O_4)_2$ | 1 | <1 |
| B-3 | 6 | Li$^+$ | 1 | $LiPF_2(C_2O_4)_2$ | 1 | <1 |
| B-4 | 7 | Li$^+$ | 1 | $LiPF_2(C_2O_4)_2$ | 1 | 1 |
| B-5 | 10 | Li$^+$ | 1 | $LiPF_2(C_2O_4)_2$ | 1 | 3 |
| B-6 | 15 | Li$^+$ | 1 | $LiPF_2(C_2O_4)_2$ | 1 | 2 |
| B-7 | — | — | — | $LiPF_2(C_2O_4)_2$ | 1 | <1 |
| B-8 | 19 | Li$^+$ | 1 | $LiPF_2(C_2O_4)_2$ | 1 | 1 |
| B-9 | 1 | Li$^+$ | 1 | $LiPF_4(C_2O_4)$ | 1 | <1 |
| B-10 | 5 | Li$^+$ | 1 | $LiPF_4(C_2O_4)$ | 1 | 1 |
| B-11 | — | — | — | $LiPF_4(C_2O_4)$ | 1 | <1 |
| B-12 | 1 | Li$^+$ | 1 | $LiP(C_2O_4)_3$ | 1 | <1 |
| B-13 | 6 | Li$^+$ | 1 | $LiP(C_2O_4)_3$ | 1 | 1 |
| B-14 | — | — | — | $LiP(C_2O_4)_3$ | 1 | <1 |
| B-15 | 1 | Li$^+$ | 1 | $LiBF_2(C_2O_4)$ | 1 | <1 |
| B-16 | 6 | Li$^+$ | 1 | $LiBF_2(C_2O_4)$ | 1 | 1 |
| B-17 | — | — | — | $LiBF_2(C_2O_4)$ | 1 | <1 |
| B-18 | 1 | Li$^+$ | 1 | $LiB(C_2O_4)_2$ | 1 | <1 |
| B-19 | 6 | Li$^+$ | 1 | $LiB(C_2O_4)_2$ | 1 | 1 |
| B-20 | — | — | — | $LiB(C_2O_4)_2$ | 1 | <1 |
| B-21 | 1 | Li$^+$ | 1 | $LiPO_2F_2$ | 1 | <1 |
| B-22 | 6 | Li$^+$ | 1 | $LiPO_2F_2$ | 1 | 1 |
| B-23 | 24 | Li$^+$ | 1 | $LiPO_2F_2$ | 1 | 2 |
| B-24 | — | — | — | $LiPO_2F_2$ | 1 | <1 |
| B-25 | 1 | Li$^+$ | 1 | $LiN(F_2PO)_2$ | 1 | <1 |
| B-26 | 6 | Li$^+$ | 1 | $LiN(F_2PO)_2$ | 1 | 1 |
| B-27 | — | — | — | $LiN(F_2PO)_2$ | 1 | <1 |
| B-28 | 1 | Li$^+$ | 1 | $LiN(FSO_2)_2$ | 1 | <1 |
| B-29 | 6 | Li$^+$ | 1 | $LiN(FSO_2)_2$ | 1 | 1 |
| B-30 | — | — | — | $LiN(FSO_2)_2$ | 1 | <1 |
| B-31 | 1 | Li$^+$ | 1 | $LiN(CF_3SO_2)_2$ | 1 | <1 |
| B-32 | 6 | Li$^+$ | 1 | $LiN(CF_3SO_2)_2$ | 1 | 1 |
| B-33 | — | — | — | $LiN(CF_3SO_2)_2$ | 1 | <1 |
| B-34 | 1 | Li$^+$ | 1 | $LiN(FSO_2)(CF_3SO_2)$ | 1 | <1 |
| B-35 | 6 | Li$^+$ | 1 | $LiN(FSO_2)(CF_3SO_2)$ | 1 | 1 |

TABLE 8-continued

| Electrolytic solution No. | Imide anion-containing salt | | | Additional solute and additive | | Concentration of total amount of compounds represented by general formulae [2] to [5] (ppm by mass) |
|---|---|---|---|---|---|---|
| | Anion compound No. | Counter cation | Concentration [mass %] | Compound | Concentration [mass %] | |
| B-36 | — | — | — | LiN(FSO$_2$)(CF$_3$SO$_2$) | 1 | <1 |
| B-37 | 1 | Li$^+$ | 1 | LiSO$_3$F | 1 | <1 |
| B-38 | 5 | Li$^+$ | 1 | LiSO$_3$F | 1 | <1 |
| B-39 | — | — | — | LiSO$_3$F | 1 | <1 |
| B-40 | 1 | Li$^+$ | 1 | LiBF$_4$ | 1 | <1 |
| B-41 | 6 | Li$^+$ | 1 | LiBF$_4$ | 1 | 1 |
| B-42 | — | — | — | LiBF$_4$ | 1 | <1 |
| B-43 | 1 | Li$^+$ | 1 | Vinylene carbonate | 1 | <1 |
| B-44 | 6 | Li$^+$ | 1 | Vinylene carbonate | 1 | 1 |
| B-45 | 20 | Li$^+$ | 1 | Vinylene carbonate | 1 | 2 |
| B-46 | — | — | — | Vinlene carbonate | 1 | <1 |
| B-47 | 1 | Li$^+$ | 1 | Vinylethylene carbonate | 1 | <1 |
| B-48 | 6 | Li$^+$ | 1 | Vinylethylene carbonate | 1 | 1 |
| B-49 | — | — | — | Vinylethylene carbonate | 1 | <1 |
| B-50 | 1 | Li$^+$ | 1 | Fluoroethylene carbonate | 1 | <1 |
| B-51 | 6 | Li$^+$ | 1 | Fluoroethylene carbonate | 1 | 1 |
| B-52 | — | — | — | Fluoroethylene carbonate | 1 | <1 |
| B-53 | 1 | Li$^+$ | 1 | Propane sultone | 1 | <1 |
| B-54 | 6 | Li$^+$ | 1 | Propane sultone | 1 | 1 |
| B-55 | — | — | — | Propene sultone | 1 | <1 |
| B-56 | 1 | Li$^+$ | 1 | 1,6-Diisocyanatohexane | 1 | 1 |
| B-57 | — | — | — | 1,6-Diisocyanatohexane | 1 | <1 |
| B-58 | 1 | Li$^+$ | 1 | Ethynylethylene carbonate | 1 | 1 |
| B-59 | — | — | — | Ethynylethylene carbonate | 1 | 1 |
| B-60 | 1 | Li$^+$ | 1 | Trans-difluoroethylene carbonate | 1 | 1 |
| B-61 | — | — | — | Trans-difluoroethylene carbonate | 1 | <1 |
| B-62 | 1 | Li$^+$ | 1 | Propenesultone | 1 | 1 |
| B-63 | — | — | — | Propenesultone | 1 | <1 |
| B-64 | 1 | Li$^+$ | 1 | 1,3,2-Dioxathiolan-2,2-dioxide | 1 | 1 |
| B-65 | — | — | — | 1,3,2-Dioxathiolan-2,2-dioxide | 1 | <1 |
| B-66 | 1 | Li$^+$ | 1 | 4-Propyl-1,3,2-dioxathiolan-2,2-dioxide | 1 | 1 |
| B-67 | — | — | — | 4-Propyl-1,3,2-dioxathiolan-2,2-dioxide | 1 | <1 |
| B-68 | 1 | Li$^+$ | 1 | Methylene methane disulfonate | 1 | 1 |
| B-69 | — | — | — | Methylene methane disulfonate | 1 | <1 |
| B-70 | 1 | Li$^+$ | 1 | 1,2-Ethanedisulfonic anhydride | 1 | 1 |
| B-71 | — | — | — | 1,2-ethanedisulfonic anhydride | 1 | <1 |
| B-72 | 1 | Li$^+$ | 1 | Tris(trimethylsilyl)borate | 1 | 1 |
| B-73 | — | — | — | Tris(trimethylsilyl)borate | 1 | <1 |
| B-74 | 1 | Li$^+$ | 1 | Succinonitrile | 1 | 1 |
| B-75 | — | — | — | Succinonitrile | 1 | <1 |
| B-76 | 1 | Li$^+$ | 1 | (Ethoxy)pentafluorocyclotriohosphazene | 1 | 1 |
| B-77 | 1 | — | — | (Ethoxy)pentafluorocyclotriphosphazene | 1 | <1 |

TABLE 9

| | Electrolytic solution No. | Positive electrode active material | Negative electrode active material | Internal resistance* [%] | Amount of gas generated* [%] |
|---|---|---|---|---|---|
| Ex. 2-1 | B-1 | LiNi$_{1/3}$Co$_{1/3}$Mn$_{1/3}$O$_2$ | Graphite | 81 | 60 |
| Ex. 2-2 | B-2 | | | 88 | 67 |
| Ex. 2-3 | B-3 | | | 83 | 65 |
| Ex. 2-4 | B-4 | | | 86 | 70 |
| Ex. 2-5 | B-5 | | | 85 | 67 |
| Ex. 2-6 | B-6 | | | 87 | 72 |
| Comp. Ex. 2-1 | B-7 | | | 100 | 100 |
| Comp. Ex. 2-2 | B-8 | | | 97 | 95 |
| Ex. 2-7 | B-9 | | | 78 | 58 |
| Ex. 2-8 | B-10 | | | 82 | 62 |
| Comp. Ex. 2-3 | B-11 | | | 100 | 100 |
| Ex. 2-9 | B-12 | | | 85 | 63 |
| Ex. 2-10 | B-13 | | | 88 | 68 |
| Comp. Ex. 2-4 | B-14 | | | 100 | 100 |
| Ex. 2-11 | B-15 | | | 82 | 62 |
| Ex. 2-12 | B-16 | | | 85 | 66 |
| Comp. Ex. 2-5 | B-17 | | | 100 | 100 |
| Ex. 2-13 | B-18 | | | 80 | 60 |
| Ex. 2-14 | B-19 | | | 83 | 64 |

TABLE 9-continued

| | Electrolytic solution No. | Positive electrode active material | Negative electrode active material | Internal resistance* [%] | Amount of gas generated* [%] |
|---|---|---|---|---|---|
| Comp. Ex. 2-6 | B-20 | | | 100 | 100 |
| Ex. 2-15 | B-21 | | | 82 | 65 |
| Ex. 2-16 | B-22 | | | 83 | 67 |
| Comp. Ex. 2-7 | B-23 | | | 95 | 99 |
| Comp. Ex. 2-8 | B-24 | | | 100 | 100 |
| Ex. 2-17 | B-25 | | | 76 | 62 |
| Ex. 2-18 | B-26 | | | 80 | 66 |
| Comp. Ex. 2-9 | B-27 | | | 100 | 100 |
| Ex. 2-19 | B-28 | | | 77 | 64 |
| Ex. 2-20 | B-29 | | | 80 | 67 |
| Comp. Ex. 2-10 | B-30 | | | 100 | 100 |
| Ex. 2-21 | B-31 | | | 79 | 65 |
| Ex. 2-22 | B-32 | | | 82 | 67 |
| Comp. Ex. 2-11 | B-33 | | | 100 | 100 |
| Ex. 2-23 | B-34 | | | 77 | 66 |
| Ex. 2-24 | B-35 | | | 81 | 69 |
| Comp. Ex. 2-12 | B-36 | | | 100 | 100 |
| Ex. 2-25 | B-37 | | | 81 | 65 |
| Ex. 2-26 | B-38 | | | 90 | 60 |
| Comp. Ex. 2-13 | B-39 | | | 100 | 100 |
| Ex. 2-27 | B-40 | | | 75 | 66 |
| Ex. 2-28 | B-41 | | | 78 | 70 |
| Comp. Ex. 2-14 | B-42 | | | 100 | 100 |
| Ex. 2-29 | B-43 | | | 71 | 58 |
| Ex. 2-30 | B-44 | | | 75 | 63 |
| Comp. Ex. 2-15 | B-45 | | | 90 | 110 |
| Comp. Ex. 2-16 | B-46 | | | 100 | 100 |
| Ex. 2-31 | B-47 | | | 69 | 60 |
| Ex. 2-32 | B-48 | | | 72 | 63 |
| Comp. Ex. 2-17 | B-49 | | | 100 | 100 |
| Ex. 2-33 | B-50 | | | 70 | 64 |
| Ex. 2-34 | B-51 | | | 74 | 68 |
| Comp. Ex. 2-18 | B-52 | | | 100 | 100 |
| Ex. 2-35 | B-53 | | | 65 | 51 |
| Ex. 2-36 | B-54 | | | 68 | 55 |
| Comp. Ex. 2-19 | B-55 | | | 100 | 100 |
| Ex. 2-37 | B-56 | | | 86 | 89 |
| Comp. Ex. 2-20 | B-57 | | | 100 | 100 |
| Ex. 2-38 | B-58 | | | 88 | 80 |
| Comp. Ex. 2-21 | B-59 | | | 100 | 100 |
| Ex. 2-39 | B-60 | | | 79 | 80 |
| Comp. Ex. 2-22 | B-61 | | | 100 | 100 |
| Ex. 2-40 | B-62 | | | 89 | 83 |
| Comp. Ex. 2-23 | B-63 | | | 100 | 100 |
| Ex. 2-41 | B-64 | | | 81 | 78 |
| Comp. Ex. 2-24 | B-65 | | | 100 | 100 |
| Ex. 2-42 | B-66 | | | 84 | 86 |
| Comp. Ex. 2-25 | B-67 | | | 100 | 100 |
| Ex. 2-43 | B-68 | | | 75 | 80 |
| Comp. Ex. 2-26 | B-69 | | | 100 | 100 |
| Ex. 2-44 | B-70 | | | 80 | 78 |
| Comp. Ex. 2-27 | B-71 | | | 100 | 100 |
| Ex. 2-45 | B-72 | | | 86 | 82 |
| Comp. Ex. 2-28 | B-73 | | | 100 | 100 |
| Ex. 2-46 | B-74 | | | 84 | 75 |
| Comp. Ex. 2-29 | B-75 | | | 100 | 100 |
| Ex. 2-47 | B-76 | | | 85 | 80 |
| Comp. Ex. 2-30 | B-77 | | | 100 | 100 |

*For Examples 2-1 to 2-6 and Comparative Examples 2-1 and 2-2, the relative value relative to the value of Comparative Example 2-1 designated as 100
For Examples 2-7 and 2-8 and Comparative Example 2-3, the relative value relative to the value of Comparative Example 2-3 designated as 100
For Examples 2-9 to 2-10 and Comparative Example 2-4, the relative value relative to the value of Comparative Example 2-4 designated as 100
For Examples 2-11 to 2-12 and Comparative Example 2-5, the relative value relative to the value of Comparative Example 2-5 designated as 100
For Examples 2-13 to 2-14 and Comparative Example 2-6, the relative value relative to the value of Comparative Example 2-6 designated as 100
For Examples 2-15 to 2-16 and Comparative Examples 2-7 and 2-8, the relative value relative to the value of Comparative Example 2-8 designated as 100
For Examples 2-17 to 2-18 and Comparative Example 2-9, the relative value relative to the value of Comparative Example 2-9 designated as 100
For Examples 2-19 to 2-20 and Comparative Example 2-10, the relative value relative to the value of Comparative Example 2-10 designated as 100
For Examples 2-21 to 2-22 and Comparative Example 2-11, the relative value relative to the value of Comparative Example 2-11 designated as 100
For Examples 2-23 to 2-24 and Comparative Example 2-12, the relative value relative to the value of Comparative Example 2-12 designated as 100

TABLE 9-continued

|  | Electrolytic solution No. | Positive electrode active material | Negative electrode active material | Internal resistance* [%] | Amount of gas generated* [%] |
|---|---|---|---|---|---|

For Examples 2-25 to 2-26 and Comparative Example 2-13, the relative value relative to the value of Comparative Example 2-13 designated as 100
For Examples 2-27 to 2-28 and Comparative Example 2-14, the relative value relative to the value of Comparative Example 2-14 designated as 100
For Examples 2-29 to 2-30 and Comparative Examples 2-15 and 2-16, the relative value relative to the value of Comparative Example 2-16 designated as 100
For Examples 2-31 to 2-32 and Comparative Example 2-17, the relative value relative to the value of Comparative Example 2-17 designated as 100
For Examples 2-33 to 2-34 and Comparative Example 2-18, the relative value relative to the value of Comparative Example 2-18 designated as 100
For Examples 2-35 to 2-36 and Comparative Example 2-19, the relative value relative to the value of Comparative Example 2-19 designated as 100
For Example 2-37 and Comparative Example 2-20, the relative value relative to the value of Comparative Example 2-20 designated as 100
For Example 2-38 and Comparative Example 2-21, the relative value relative to the value of Comparative Example 2-21 designated as 100
For Example 2-39 and Comparative Example 2-22, the relative value relative to the value of Comparative Example 2-22 designated as 100
For Example 2-40 and Comparative Example 2-23, the relative value relative to the value of Comparative Example 2-23 designated as 100
For Example 2-41 and Comparative Example 2-24, the relative value relative to the value of Comparative Example 2-24 designated as 100
For Example 2-42 and Comparative Example 2-25, the relative value relative to the value of Comparative Example 2-25 designated as 100
For Example 2-43 and Comparative Example 2-26, the relative value relative to the value of Comparative Example 2-26 designated as 100
For Example 2-44 and Comparative Example 2-27, the relative value relative to the value of Comparative Example 2-27 designated as 100
For Example 2-45 and Comparative Example 2-28, the relative value relative to the value of Comparative Example 2-28 designated as 100
For Example 2-46 and Comparative Example 2-29, the relative value relative to the value of Comparative Example 2-29 designated as 100
For Example 2-47 and Comparative Example 2-30, the relative value relative to the value of Comparative Example 2-30 designated as 100

The above results show that in any one of the examples wherein the electrolyte contained an additional solute and an additive together with $LiPF_6$, the internal resistance characteristic of the laminated cell containing the electrolyte for a non-aqueous electrolyte battery of the present invention and the amount of gas generated were both excellent, as compared with the respective corresponding comparative examples. These results show that, by using the electrolyte for a non-aqueous electrolyte battery of the present invention, a non-aqueous electrolyte battery having an excellent internal resistance characteristic and an excellent effect to suppress the amount of gas generated is obtained regardless of the kinds of the additional solute and the additive.

Examples 3-1 to 3-4 and Comparative Examples 3-1 to 3-4

Experiment Example Wherein Different Negative Electrode was Used

Batteries each having a construction wherein the negative electrode and the electrolyte used in Example 1-1 were changed as shown in Table 10 were evaluated in the same manner as in Example 1-1. Each negative electrode having $Li_4Ti_5O_{12}$ as a negative electrode active material was prepared by mixing 90 mass % of $Li_4Ti_5O_{12}$ powder with 5 mass % of PVDF as a binder and 5 mass % of acetylene black as a conducting agent, further adding N-methylpyrrolidone thereto, applying the resulting paste onto copper foil, and drying the resultant foil. The end-of-charge voltage and the end-of-discharge voltage upon evaluation of each battery were 2.7 V and 1.5 V, respectively. In Examples 3-1 to 3-4 and Comparative Examples 3-1 to 3-4, the value of the internal resistance characteristic of each battery and the value of the amount of gas generated are relative values relative to the internal resistance after the cycle test and the amount of gas generated associated with the cycle test of a laminated cell assembled using an electrolyte that does not contain the imide anion-containing salt of the present invention, respectively, designated as 100.

Examples 4-1 to 4-5 and Comparative Examples 4-1 to 4-5

Experimental Example Wherein Different Negative Electrode was Used

Batteries each having a construction wherein the negative electrode and the electrolyte used in Example 1-1 were changed as shown in Table 10 were evaluated in the same manner as in Example 1-1. Each negative electrode having graphite (containing silicon) as a negative electrode active material was prepared by mixing 80 mass % of graphite powder with 10 mass % of silicon powder and 10 mass % of PVDF as a binder, further adding N-methylpyrrolidone thereto, applying the resulting paste onto copper foil, and drying the resultant foil. The end-of-charge voltage and the end-of-discharge voltage upon evaluation of each battery were the same as in Example 1-1. In Examples 4-1 to 4-5 and Comparative Examples 4-1 to 4-5, the value of the internal resistance characteristic of each battery and the value of the amount of gas generated are relative values relative to the internal resistance after the cycle test and the amount of gas generated associated with the cycle test of a laminated cell assembled using an electrolyte that does not contain the imide anion-containing salt of the present invention, respectively, designated as 100.

Examples 5-1 to 5-4 and Comparative Examples 5-1 to 5-4

Experimental Example Wherein Different Negative Electrode was Used

Batteries each having a construction wherein the negative electrode and the electrolyte used in Example 1-1 were changed as shown in Table 10 were evaluated in the same manner as in Example 1-1. Each negative electrode having hard carbon as a negative electrode active material was prepared by mixing 90 mass % of hard carbon with 5 mass % of PVDF as a binder and 5 mass % of acetylene black as a conducting agent, further adding N-methylpyrrolidone thereto, applying the resulting paste onto copper foil, and drying the resultant foil. The end-of-charge voltage and the end-of-discharge voltage upon evaluation of each battery were 4.2 V and 2.2 V, respectively. In Examples 5-1 to 5-4 and Comparative Examples 5-1 to 5-4, the value of the internal resistance characteristic of each battery and the value of the amount of gas generated are relative values relative to the internal resistance after the cycle test and the amount of gas generated associated with the cycle test of a laminated cell assembled using an electrolyte that does not contain the imide anion-containing salt of the present invention, respectively, designated as 100.

TABLE 10

|  | Electrolytic solution No. | Positive electrode active material | Negative electrode active material | Internal resistance* [%] | Amount of gas generated* [%] |
| --- | --- | --- | --- | --- | --- |
| Ex. 3-1 | A-1 | $LiNi_{1/3}Co_{1/3}Mn_{1/3}O_2$ | $Li_4Ti_5O_{12}$ | 80 | 70 |
| Ex. 3-2 | A-15 | | | 82 | 72 |
| Comp. Ex. 3-1 | A-35 | | | 100 | 100 |
| Comp. Ex. 3-2 | A-38 | | | 97 | 94 |
| Ex. 3-3 | B-1 | | | 91 | 80 |
| Ex. 3-4 | B-3 | | | 94 | 84 |
| Comp. Ex. 3-3 | B-7 | | | 100 | 100 |
| Comp. Ex. 3-4 | B-8 | | | 98 | 95 |
| Ex. 4-1 | A-1 | | Graphite (containing silicon) | 62 | 49 |
| Ex. 4-2 | A-15 | | | 65 | 52 |
| Ex. 4-3 | B-50 | | | 63 | 50 |
| Comp. Ex. 4-1 | A-35 | | | 100 | 100 |
| Comp. Ex. 4-2 | A-38 | | | 94 | 94 |
| Comp. Ex. 4-3 | B-52 | | | 95 | 100 |
| Ex. 4-4 | B-1 | | | 83 | 60 |
| Ex. 4-5 | B-3 | | | 84 | 66 |
| Comp. Ex. 4-4 | B-7 | | | 100 | 100 |
| Comp. Ex. 4-5 | B-8 | | | 96 | 95 |
| Ex. 5-1 | A-1 | | Hard carbon | 65 | 55 |
| Ex. 5-2 | A-15 | | | 68 | 59 |
| Comp. Ex. 5-1 | A-35 | | | 100 | 100 |
| Comp. Ex. 5-2 | A-38 | | | 90 | 92 |
| Ex. 5-3 | B-1 | | | 85 | 65 |
| Ex. 5-4 | B-3 | | | 86 | 69 |
| Comp. Ex. 5-3 | B-7 | | | 100 | 100 |
| Comp. Ex. 5-4 | B-8 | | | 93 | 90 |

*For Examples 3-1 and 3-2 and Comparative Examples 3-1 and 3-2, the relative value relative to the value of Comparative Example 3-1 designated as 100

For Examples 3-3 and 3-4 and Comparative Examples 3-3 and 3-4, the relative value relative to the value of Comparative Example 3-3 designated as 100

For Examples 4-1 to 4-3 and Comparative Examples 4-1 to 4-3, the relative value relative to the value of Comparative Example 4-1 designated as 100

For Examples 4-4 and 4-5 and Comparative Examples 4-4 and 4-5, the relative value relative to the value of Comparative Example 4-4 designated as 100

For Examples 5-1 and 5-2 and Comparative Examples 5-1 and 5-2, the relative value relative to the value of Comparative Example 5-1 designated as 100

For Examples 5-3 and 5-4 and Comparative Examples 5-3 and 5-4, the relative value relative to the value of Comparative Example 5-3 designated as 100

Examples 6-1 to 6-4 and Comparative Examples 6-1 to 6-4

Experimental Example Wherein Different Positive Electrode was Used

Batteries each having a construction wherein the positive electrode and the electrolyte used in Example 1-1 were changed as shown in Table 11 were evaluated in the same manner as in Example 1-1. Each positive electrode having $LiCoO_2$ as a positive electrode active material was prepared by mixing 90 mass % of $LiCoO_2$ powder with 5 mass % of PVDF as a binder and 5 mass % of acetylene black as a conductive material, further adding N-methylpyrrolidone thereto, applying the resulting paste onto aluminum foil, and drying the resultant foil. The end-of-charge voltage and the end-of-discharge voltage upon evaluation of each battery were 4.2 V and 3.0 V, respectively. In Examples 6-1 to 6-4 and Comparative Examples 6-1 to 6-4, the value of the internal resistance characteristic of each battery and the value of the amount of gas generated are relative values relative to the internal resistance after the cycle test and the amount of gas generated associated with the cycle test of a laminated cell assembled using an electrolyte that does not contain the imide anion-containing salt of the present invention measured, respectively, designated as 100.

Examples 7-1 to 7-4 and Comparative Examples 7-1 to 7-4

Experimental Example Wherein Different Positive Electrode was Used

Batteries each having a construction wherein the positive electrode and the electrolyte used in Example 1-1 were changed as shown in Table 11 were evaluated in the same manner as in Example 1-1. Each positive electrode having $LiNi_{0.8}Co_{0.15}Al_{0.5}O_2$ as a positive electrode active material was prepared by mixing 90 mass % of $LiNi_{0.8}Co_{0.15}Al_{0.05}O_2$ powder with 5 mass % of PVDF as a binder and 5 mass % of acetylene black as a conductive material, further adding N-methylpyrrolidone thereto, applying the resulting paste onto aluminum foil, and drying the resultant foil. The end-of-charge voltage and the end-of-discharge voltage upon evaluation of each battery were 4.2 V and 3.0 V, respectively. In Examples 7-1 to 7-4 and Comparative Examples 7-1 to 7-4, the value of the internal resistance characteristic of each battery and the value of the amount of gas generated are relative values relative to the internal resistance after the cycle test and the amount of gas generated associated with the cycle test of a laminated cell assembled using an electrolyte that does not contain the imide anion-containing salt of the present invention, respectively, designated as 100.

Examples 8-1 to 8-4 and Comparative Examples 8-1 to 8-4

Experimental Example Wherein Different Positive Electrode was Used

Batteries each having a construction wherein the positive electrode and the electrolyte used in Example 1-1 were changed as shown in Table 11 were evaluated in the same manner as in Example 1-1. Each positive electrode having $LiMn_2O_4$ as a positive electrode active material was prepared by mixing 90 mass % of $LiMn_2O_4$ powder with 5 mass % of PVDF as a binder and 5 mass % of acetylene black as a conductive material, further adding N-methylpyrrolidone thereto, applying the resulting paste onto aluminum foil, and drying the resultant foil. The end-of-charge voltage and the end-of-discharge voltage upon evaluation of each battery were 4.2 V and 3.0 V, respectively. In Examples 8-1 to 8-4 and Comparative Examples 8-1 to 8-4, the value of the internal resistance characteristic of each battery and the value of the amount of gas generated are relative values relative to the internal resistance after the cycle test and the amount of gas generated associated with the cycle test of a laminated cell assembled using an electrolyte that does not contain the imide anion-containing salt of the present invention, respectively, designated as 100.

Examples 9-1 to 9-4 and Comparative Examples 9-1 to 9-4

Experimental Example Wherein Different Positive Electrode was Used

Batteries each having a construction wherein the positive electrode and the electrolyte used in Example 1-1 were changed as shown in Table 11 were evaluated in the same manner as in Example 1-1. Each positive electrode having $LiFePO_4$ as a positive electrode active material was prepared by mixing 90 mass % of $LiFePO_4$ powder coated with amorphous carbon with 5 mass % of PVDF as a binder and 5 mass % of acetylene black as a conductive material, further adding N-methylpyrrolidone thereto, applying the resulting paste onto aluminum foil, and drying the resultant foil. The end-of-charge voltage and the end-of-discharge voltage upon evaluation of each battery were 4.1 V and 2.5 V, respectively. In Examples 9-1 to 9-4 and Comparative Examples 9-1 to 9-4, the value of the internal resistance characteristic of each battery and the value of the amount of gas generated are relative values relative to the internal resistance after the cycle test and the amount of gas generated associated with the cycle test of a laminated cell assembled using an electrolyte that does not contain the imide anion-containing salt of the present invention, respectively, designated as 100.

TABLE 11

| | Electrolytic solution No. | Positive electrode active material | Negative electrode active material | Internal resistance* [%] | Amount of gas generated* [%] |
|---|---|---|---|---|---|
| Ex. 6-1 | A-1 | $LiCoO_2$ | Graphite | 61 | 49 |
| Ex. 6-2 | A-15 | | | 62 | 53 |
| Comp. Ex. 6-1 | A-35 | | | 100 | 100 |
| Comp. Ex. 6-2 | A-38 | | | 90 | 95 |
| Ex. 6-3 | B-1 | | | 82 | 61 |
| Ex. 6-4 | B-3 | | | 83 | 66 |
| Comp. Ex. 6-3 | B-7 | | | 100 | 100 |

TABLE 11-continued

| | Electrolytic solution No. | Positive electrode active material | Negative electrode active material | Internal resistance* [%] | Amount of gas generated* [%] |
|---|---|---|---|---|---|
| Comp. Ex. 6-4 | B-8 | | | 92 | 90 |
| Ex. 7-1 | A-1 | $LiNi_{0.8}Co_{0.15}Al_{0.05}O_2$ | | 65 | 52 |
| Ex. 7-2 | A-15 | | | 67 | 56 |
| Comp. Ex. 7-1 | A-35 | | | 100 | 100 |
| Comp. Ex. 7-2 | A-38 | | | 94 | 90 |
| Ex. 7-3 | B-1 | | | 83 | 64 |
| Ex. 7-4 | B-3 | | | 87 | 68 |
| Comp. Ex. 7-3 | B-7 | | | 100 | 100 |
| Comp. Ex. 7-4 | B-8 | | | 93 | 91 |
| Ex. 8-1 | A-1 | $LiMn_2O_4$ | | 72 | 60 |
| Ex. 8-2 | A-15 | | | 75 | 65 |
| Comp. Ex. 8-1 | A-35 | | | 100 | 100 |
| Comp. Ex. 8-2 | A-38 | | | 90 | 99 |
| Ex. 8-3 | B-1 | | | 85 | 72 |
| Ex. 8-4 | B-3 | | | 87 | 77 |
| Comp. Ex. 8-3 | B-7 | | | 100 | 100 |
| Comp. Ex. 8-4 | B-8 | | | 97 | 90 |
| Ex. 9-1 | A-1 | $LiFePO_4$ | | 75 | 75 |
| Ex. 9-2 | A-15 | | | 78 | 78 |
| Comp. Ex. 9-1 | A-35 | | | 100 | 100 |
| Comp. Ex. 9-2 | A-38 | | | 91 | 90 |
| Ex. 9-3 | B-1 | | | 89 | 88 |
| Ex. 9-4 | B-3 | | | 92 | 92 |
| Comp. Ex. 9-3 | B-7 | | | 100 | 100 |
| Comp. Ex. 9-4 | B-8 | | | 96 | 99 |

*For Examples 6-1 and 6-2 and Comparative Examples 6-1 and 6-2, the relative value relative to the value of Comparative Example 6-1 designated as 100
For Examples 6-3 and 6-4 and Comparative Examples 6-3 and 6-4, the relative value relative to the value of Comparative Example 6-3 designated as 100
For Examples 7-1 and 7-2 and Comparative Examples 7-1 and 7-2, the relative value relative to the value of Comparative Example 7-1 designated as 100
For Examples 7-3 and 7-4 and Comparative Examples 7-3 and 7-4, the relative value relative to the value of Comparative Example 7-3 designated as 100
For Examples 8-1 and 8-2 and Comparative Examples 8-1 and 8-2, the relative value relative to the value of Comparative Example 8-1 designated as 100
For Examples 8-3 and 8-4 and Comparative Examples 8-3 and 8-4, the relative value relative to the value of Comparative Example 8-3 designated as 100
For Examples 9-1 and 9-2 and Comparative Examples 9-1 and 9-2, the relative value relative to the value of Comparative Example 9-1 designated as 100
For Examples 9-3 and 9-4 and Comparative Examples 9-3 and 9-4, the relative value relative to the value of Comparative Example 9-3 designated as 100

The above results show that in any one of the examples wherein $Li_4Ti_5O_{12}$, graphite (containing silicon), or hard carbon is contained as a negative electrode active material, the internal resistance characteristic and the amount of gas generated of a laminated cell containing the electrolyte for a non-aqueous electrolyte battery of the present invention are both excellent compared to the respective corresponding comparative examples. These results show that, by using the electrolyte for a non-aqueous electrolyte battery of the present invention, a non-aqueous electrolyte battery having an excellent internal resistance characteristic and an excellent effect to suppress the amount of gas generated is obtained regardless of the type of the negative electrode active material.

The above results also show that in any one of the examples wherein $LiCoO_2$, $LiNi_{0.8}Co_{0.15}Al_{0.05}O_2$, $LiMn_2O_4$ or $LiFePO_4$ is contained as a positive electrode active material, the internal resistance characteristic and the amount of gas generated of a laminated cell containing the electrolyte for a non-aqueous electrolyte battery of the present invention are both excellent compared to the respective corresponding comparative examples. These results show that, by using the electrolyte for a non-aqueous electrolyte battery of the present invention, a non-aqueous electrolyte battery having an excellent internal resistance characteristic and an excellent effect to suppress the amount of gas generated is obtained regardless of the type of the positive electrode active material.

Example 10-1

As a non-aqueous solvent, a mixed solvent of propylene carbonate, ethylene carbonate and diethyl carbonate in a volume ratio of 2:2:6 was used and in order to achieve a concentration of $NaPF_6$ as a solute at 1.0 mol/L in the solvent, a sodium salt of the compound No. 1 as an imide anion-containing salt (the Cl content of the imide anion-containing salt, as a raw material, before being dissolved in the electrolyte was 10 ppm by mass) was dissolved at a concentration of 1.0 mass % relative to the total amount of the non-aqueous solvent, the solute and the imide anion-containing salt, so as to prepare an electrolyte for a non-aqueous electrolyte battery as shown in Table 12. The concentration of free acid in the electrolyte was 12 ppm by mass. The above preparation was carried out, while the liquid temperature was maintained at 25° C.

The resulting electrolyte was used to assemble a cell in the same manner as in Example 1-1 except that $NaFe_{0.5}Co_{0.5}O_2$ was used as a positive electrode material and hard carbon was used as a negative electrode material. The battery was evaluated in the same manner as in Example 1-1. Each positive electrode having $NaFe_{0.5}Co_{0.5}O_2$ as a positive electrode active material was prepared by mixing 90 mass % of $NaFe_{0.5}Co_{0.5}O_2$ powder with 5 mass % of PVDF as a binder and 5 mass % of acetylene black as a conductive material, further adding N-methylpyrrolidone thereto, applying the resulting paste onto aluminum foil, and drying the resultant foil. The end-of-charge voltage and the end-of-discharge voltage upon evaluation of each battery were 3.8 V and 1.5 V, respectively. The results of evaluation are shown in Table 13.

Examples 10-2 to 10-18 and Comparative Examples 10-1 to 10-9

Electrolytes for a non-aqueous electrolyte battery were prepared, cells were assembled, and the resulting batteries were evaluated in the same manner as in Example 10-1 except that the kind and the concentration of the solute and the kind and the concentration of the imide anion-containing salt were changed as shown in Table 12. The concentration of free acid in each electrolyte used in the examples was not higher than 50 ppm by mass. The results of evaluation are shown in Table 13. In Examples 10-1 to 10-18 and Comparative Examples 10-1 to 10-9, the value of the internal resistance characteristic of each battery and the value of the amount of gas generated are relative values relative to the internal resistance after the cycle test and the amount of gas generated associated with the cycle test of a laminated cell assembled using an electrolyte that does not contain the imide anion-containing salt of the present invention, respectively, designated as 100.

TABLE 12

| Electrolytic solution No. | Imide anion-containing salt | | | Additional solute and additive | | Concentration of total amount of compounds represented by general formulae [2] to [5] (ppm by mass) |
| | Anion compound No. | Counter cation | Concentration [mass %] | Compound | Concentration [mass %] | |
|---|---|---|---|---|---|---|
| C-1 | 1 | $Na^+$ | 1 | — | — | <1 |
| C-2 | 5 | $Na^+$ | 1 | — | — | <1 |
| C-3 | 6 | $Na^+$ | 1 | — | — | 2 |
| C-4 | 7 | $Na^+$ | 1 | — | — | 2 |
| C-5 | 10 | $Na^+$ | 1 | — | — | 4 |
| C-6 | 15 | $Na^+$ | 1 | — | — | 2 |
| C-7 | — | — | — | — | — | <1 |
| C-8 | 19 | $Na^+$ | 1 | — | — | 1 |
| C-9 | 20 | $Na^+$ | 1 | — | — | <1 |
| C-10 | 1 | $Na^+$ | 1 | $NaPF_4(C_2O_4)$ | 1 | <1 |
| C-11 | 5 | $Na^+$ | 1 | $NaPF_4(C_2O_4)$ | 1 | <1 |
| C-12 | 6 | $Na^+$ | 1 | $NaPF_4(C_2O_4)$ | 1 | 2 |
| C-13 | 7 | $Na^+$ | 1 | $NaPF_4(C_2O_4)$ | 1 | 2 |
| C-14 | 10 | $Na^+$ | 1 | $NaPF_4(C_2O_4)$ | 1 | 4 |
| C-15 | 15 | $Na^+$ | 1 | $NaPF_4(C_2O_4)$ | 1 | 2 |
| C-16 | — | — | — | $NaPF_4(C_2O_4)$ | 1 | 1 |
| C-17 | 19 | $Na^+$ | 1 | $NaPF_4(C_2O_4)$ | 1 | 1 |
| C-18 | 1 | $Na^+$ | 1 | $NaPF_2(C_2O_4)_2$ | 1 | <1 |
| C-19 | 6 | $Na^+$ | 1 | $NaPF_2(C_2O_4)_2$ | 1 | 2 |
| C-20 | — | — | — | $NaPF_2(C_2O_4)_2$ | 1 | <1 |
| C-21 | 1 | $Na^+$ | 1 | $NaN(FSO_2)_2$ | 1 | <1 |
| C-22 | 6 | $Na^+$ | 1 | $NaN(FSO_2)_2$ | 1 | 2 |
| C-23 | — | — | — | $NaN(FSO_2)_2$ | 1 | <1 |
| C-24 | 1 | $Na^+$ | 1 | Fluoroethylene carbonate | 1 | <1 |
| C-25 | 6 | $Na^+$ | 1 | Fluoroethylene carbonate | 1 | 2 |
| C-26 | — | — | — | Fluoroethylene carbonate | 1 | <1 |
| C-27 | 20 | $Na^+$ | 1 | Fluoroethylene carbonate | 1 | <1 |

TABLE 13

| | Electrolytic solution No. | Positive electrode active material | Negative electrode active material | Internal resistance* [%] | Amount of gas generated* [%] |
|---|---|---|---|---|---|
| Ex. 10-1 | C-1 | $NaFe_{0.5}Co_{0.5}O_2$ | Hard Carbon | 51 | 45 |
| Ex. 10-2 | C-2 | | | 70 | 50 |
| Ex. 10-3 | C-3 | | | 54 | 49 |
| Ex. 10-4 | C-4 | | | 60 | 54 |
| Ex. 10-5 | C-5 | | | 59 | 50 |
| Ex. 10-6 | C-6 | | | 64 | 55 |
| Comp. Ex. 10-1 | C-7 | | | 100 | 100 |
| Comp. Ex. 10-2 | C-8 | | | 91 | 94 |
| Comp. Ex. 10-3 | C-9 | | | 90 | 102 |
| Ex. 10-7 | C-10 | | | 74 | 57 |
| Ex. 10-8 | C-11 | | | 80 | 64 |
| Ex. 10-9 | C-12 | | | 75 | 62 |
| Ex. 10-10 | C-13 | | | 79 | 66 |
| Ex. 10-11 | C-14 | | | 77 | 62 |
| Ex. 10-12 | C-15 | | | 80 | 68 |
| Comp. Ex. 10-4 | C-16 | | | 100 | 100 |
| Comp. Ex. 10-5 | C-17 | | | 95 | 91 |

TABLE 13-continued

| Electrolytic solution No. | Positive electrode active material | Negative electrode active material | Internal resistance* [%] | Amount of gas generated* [%] |
|---|---|---|---|---|
| Ex. 10-13 | C-18 | | 70 | 53 |
| Ex. 10-14 | C-19 | | 73 | 56 |
| Comp. Ex. 10-6 | C-20 | | 100 | 100 |
| Ex. 10-15 | C-21 | | 69 | 60 |
| Ex. 10-16 | C-22 | | 70 | 62 |
| Comp. Ex. 10-7 | C-23 | | 100 | 100 |
| Ex. 10-17 | C-24 | | 64 | 59 |
| Ex. 10-18 | C-25 | | 69 | 60 |
| Comp. Ex. 10-8 | C-26 | | 100 | 100 |
| Comp. Ex. 10-9 | C-27 | | 90 | 101 |

*For Examples 10-1 to 10-6 and Comparative Examples 10-1 to 10-3, the relative value relative to the value of Comparative Example 10-1 designated as 100

For Examples 10-7 to 10-12 and Comparative Examples 10-4 and 10-5, the relative value relative to the value of Comparative Example 10-4 designated as 100

For Examples 10-13 and 10-14 and Comparative Example 10-6, the relative value relative to the value of Comparative Example 10-6 designated as 100

For Examples 10-15 and 10-16 and Comparative Example 10-7, the relative value relative to the value of Comparative Example 10-7 designated as 100

For Examples 10-17 and 10-18 and Comparative Examples 10-8 and 10-9, the relative value relative to the value of Comparative Example 10-8 designated as 100

The results in Table 13 show that it is also true for a sodium-ion battery in that the examples wherein the imide anion-containing salt of the present invention was added to the electrolyte exhibit an excellent internal resistance characteristics and an excellent effect to suppress the amount of gas generated as compared to the comparative examples wherein no such a salt was added.

In the case wherein the imide anion-containing salt of the present invention was not contained (Comparative Examples 10-1, 10-4, 10-6, 10-7 and 10-8) and in the case wherein an imide anion-containing salt containing a phosphorus atom alone or a sulfur atom alone was used (Comparative Examples 10-2, 10-3, 10-5 and 10-9), the internal resistance characteristic was relatively high and the amount of gas generated was also relatively high. In contrast, in the case wherein both of the imide anion-containing salt of the present invention and a hexafluorophosphate were contained, the excellent internal resistance characteristic and an excellent effect to suppress the amount of gas generated were exhibited.

It was also shown that also in the examples where an additional solute and an additive were added together with NaPF$_6$, when the imide anion-containing salt of the present invention was added thereto, an internal resistance characteristic and an effect to suppress the amount of gas generated were improved, as compared to the comparative examples wherein the imide anion-containing salt of the present invention was not added, and accordingly, the same effects as those above were obtained.

Examples 11-1 to 11-21 and Comparative Examples 11-1 to 11-19

Experimental Example 2 Wherein Additional Solute and Additive were Added

Non-aqueous electrolytes Nos. D-1 to D-40 were prepared and evaluated in the same manner as in Example 1-1 except that conditions for preparation of non-aqueous electrolytes shown in Table 14 were adopted. Each of the electrolytes contains 1.0 mol/L of LiPF$_6$ as a solute and the concentration of the total amount of the compounds represented by the general formulae [2] to [5] is lower than 5 ppm by mass. The concentration of free acid in each electrolyte used in the examples was not higher than 120 ppm by mass. Each positive electrode having LiNi$_{0.6}$Co$_{0.2}$Mn$_{0.2}$O$_2$ as a positive electrode active material was prepared by mixing 90 mass % of LiNi$_{0.6}$Co$_{0.2}$Mn$_{0.2}$O$_2$ powder with 5 mass % of PVDF as a binder and 5 mass % of acetylene black as a conductive material, further adding N-methylpyrrolidone thereto, applying the resulting paste onto aluminum foil, and drying the resultant. The end-of-charge voltage and the end-of-discharge voltage upon evaluation of each battery were 4.35 V and 3.0 V, respectively. Each positive electrode having LiNi$_{0.6}$Co$_{0.2}$Mn$_{0.2}$O$_2$+LiMn$_2$O$_4$ as a positive electrode active material was prepared by mixing 60 mass % of LiNi$_{0.6}$Co$_{0.2}$Mn$_{0.2}$O$_2$ powder with 30 mass % of LiMn$_2$O$_4$ powder and 5 mass % of PVDF as a binder and 5 mass % of acetylene black as a conductive material, further adding N-methylpyrrolidone thereto, applying the resulting paste onto aluminum foil, and drying the resultant foil. The end-of-charge voltage and the end-of-discharge voltage upon evaluation of each battery were 4.2 V and 3.0 V, respectively.

The results of evaluation of the batteries containing the electrolytes and the electrodes described above are shown in Table 15. In Table 15, the value of the internal resistance characteristic of each battery at −30° C. and the value of the amount of gas generated are relative values relative to the internal resistance after the cycle test and the amount of gas generated associated with the cycle test of a laminated cell assembled using an electrolyte that does not contain the imide anion-containing salt of the present invention, respectively, designated as 100.

TABLE 14

| Electrolytic solution No. | Imide anion-containing salt | | | Additional solute and additive | | Concentration of total amount of compounds represented by general formulae [2] to [5] (ppm by mass) |
|---|---|---|---|---|---|---|
| | Anion Compound No. | Counter cation | Concentration [mass %] | Compound | Concentration [mass %] | |
| D-1 | 5 | Li$^+$ | 0.5 | LiPF$_2$(C$_2$O$_4$)$_2$ | 0.5 | 1 |
| | 6 | Li$^+$ | 1.0 | VC | 0.3 | |
| D-2 | — | — | — | LiPF(C$_2$O$_4$)$_2$ | 0.5 | <1 |
| | | | | VC | 0.3 | |
| D-3 | 1 | Li$^+$ | 2.0 | LiPO$_2$F$_2$ | 0.5 | 2 |
| | 15 | Li$^+$ | 0.1 | VC | 0.5 | |
| D-4 | — | — | — | LiPO$_2$F$_2$ | 0.5 | <1 |
| | | | | VC | 0.5 | |
| D-5 | 1 | Li$^+$ | 2.0 | LiPO$_2$F$_2$ | 1.0 | 2 |
| | | | | LiN(F$_2$PO)$_2$ | 0.02 | |
| D-6 | — | — | — | LiPO$_2$F$_2$ | 1.0 | <1 |
| | | | | LiN(F$_2$PO)$_2$ | 0.02 | |
| D-7 | 1 | Li$^+$ | 1 | LiPO$_2$F$_2$ | 0.01 | <1 |
| | | | | LiSO$_3$F | 0.5 | |
| | | | | VC | 1.0 | |
| | | | | t-Amylbenzene | 1.0 | |
| D-8 | — | — | — | LiPO$_2$F$_2$ | 0.01 | <1 |
| | | | | LiSO$_3$F | 0.5 | |
| | | | | VC | 1.0 | |
| | | | | t-Amylbenzene | 1.0 | |
| D-9 | 5 | Li$^+$ | 0.5 | LiPF$_2$(C$_2$O$_4$)$_2$ | 0.5 | <1 |
| | | | | LiPO$_2$F$_2$ | 1.0 | |
| D-10 | — | — | — | LiPF$_2$(C$_2$O$_4$)$_2$ | 0.5 | <1 |
| | | | | LiPO2F2 | 1.0 | |
| D-11 | 5 | Li$^+$ | 0.5 | LiPF$_2$(C$_2$O$_4$)$_2$ | 0.5 | 1 |
| | 6 | Li$^+$ | 0.5 | LiPF$_4$(C$_2$O$_4$) | 0.2 | |
| D-12 | — | — | — | LiPF$_2$(C$_2$O$_4$)$_2$ | 0.5 | <1 |
| | | | | LiPF$_4$(C$_2$O$_4$) | 0.2 | |
| D-13 | -1 | Li$^+$ | 2 | LiPO$_2$F$_2$ | 0.5 | 2 |
| | | | | LiSO$_2$F | 0.005 | |
| | | | | MeOSO$_3$Li | 0.3 | |
| D-14 | — | — | — | LiPO$_2$F$_2$ | 0.5 | <1 |
| | | | | LiSO$_3$F | 0.005 | |
| | | | | MeOSO$_3$Li | 0.3 | |
| D-15 | 1 | Li$^+$ | 1 | LiBF$_2$(C$_2$O$_4$) | 1.0 | <1 |
| | | | | LiPO$_2$F$_2$ | 0.2 | |
| | | | | LiSO$_3$F | 0.05 | |
| | | | | FEC | 0.3 | |
| D-16 | — | — | — | LiBF$_2$(C$_2$O$_4$) | 1.0 | <1 |
| | | | | LiPO$_2$F$_2$ | 0.2 | |
| | | | | LiSO$_3$F | 0.05 | |
| | | | | FEC | 0.3 | |
| D-17 | 5 | Li$^+$ | 0.2 | LiPF$_2$(C$_2$O$_4$)$_2$ | 1.0 | <1 |
| | | | | LiPF$_4$(C$_2$O$_4$) | 0.2 | |
| | | | | LiPO$_2$F$_2$ | 0.5 | |
| | | | | t-Amylbenzene | 1.0 | |
| D-18 | — | — | — | LiPF$_2$(C$_2$O$_4$)$_2$ | 1.0 | <1 |
| | | | | LiPF$_4$(C$_2$O$_4$) | 0.2 | |
| | | | | LiPO$_2$F$_2$ | 0.5 | |
| | | | | t-Amylbenzene | 1.0 | |
| D-19 | 1 | Li$^+$ | 1 | LiN(F$_2$PO)$_2$ | 0.005 | 3 |
| | | | | LiPO$_2$F$_2$ | 0.01 | |
| | 6 | Li$^+$ | 1 | t-Amylbenzene | 1.0 | |
| | | | | VC | 1.0 | |
| D-20 | — | — | — | LiN(F$_2$PO)$_2$ | 0.005 | <1 |
| | | | | LiPO$_2$F$_2$ | 0.01 | |
| | | | | t-Amylbenzene | 1.0 | |
| | | | | VC | 1.0 | |
| D-21 | 6 | Li$^+$ | 1 | LiPF$_4$(C$_2$O$_4$) | 1.0 | 1 |
| | | | | LiN(FSO$_2$)$_2$ | 2.0 | |
| | | | | LiPO$_2$F$_2$ | 0.01 | |
| D-22 | — | — | — | LiPF$_4$(C$_2$O$_4$) | 1.0 | <1 |
| | | | | LiN(FSO$_2$)$_2$ | 2.0 | |
| | | | | LiPO$_2$F$_3$ | 0.01 | |
| D-23 | 5 | Li$^+$ | 0.5 | LiN(F$_2$PO)$_2$ | 0.005 | <1 |
| | | | | LiPO$_2$F$_2$ | 0.01 | |
| | 6 | Li$^+$ | 0.5 | LiSO$_3$F$_2$ | 0.05 | |
| | | | | VC | 1.0 | |

TABLE 14-continued

| Electrolytic solution No. | Imide anion-containing salt | | | Additional solute and additive | | Concentration of total amount of compounds represented by general formulae [2] to [5] (ppm by mass) |
|---|---|---|---|---|---|---|
| | Compound No. | Counter cation | Concentration [mass %] | Compound | Concentration [mass %] | |
| D-24 | — | — | — | LiN(F$_2$PO)$_3$ | 0.005 | <1 |
| | | | | LiPO$_2$F$_2$ | 0.01 | |
| | | | | LiSO$_3$F | 0.05 | |
| | | | | VC | 1.0 | |
| D-25 | 1 | Li$^+$ | 1.5 | LiBF$_2$(C$_2$O$_4$) | 0.5 | 2 |
| | | | | LiPO$_2$F$_2$ | 0.05 | |
| | 5 | Li$^+$ | 0.2 | LiSO$_3$F | 0.005 | |
| | | | | FEC | 0.2 | |
| D-26 | — | — | — | LiBF$_2$(C$_2$O$_4$) | 0.5 | <1 |
| | | | | LiPO$_2$F$_2$ | 0.05 | |
| | | | | LiSO$_3$F | 0.005 | |
| | | | | FEC | 0.2 | |
| D-27 | 1 | Li$^+$ | 0.5 | LiB(C$_2$O$_4$)$_2$ | 0.5 | 1 |
| | | | | LiSO$_3$F | 0.2 | |
| | | | | LiN(FSO$_2$)$_2$ | 0.2 | |
| | | | | LiPO$_2$F$_2$ | 0.05 | |
| | | | | VC | 0.5 | |
| D-28 | — | — | — | LiB(C$_2$O$_4$)$_2$ | 0.5 | <1 |
| | | | | LiSO$_3$F | 0.2 | |
| | | | | LiN(FSO$_2$)$_2$ | 0.2 | |
| | | | | LiPO$_2$F$_2$ | 0.05 | |
| | | | | VC | 0.5 | |
| D-29 | 1 | Li$^+$ | 1 | LiPF$_2$(C$_2$O$_4$)$_2$ | 0.5 | 1 |
| | | | | VC | 0.3 | |
| D-2 | — | — | — | LiPF$_2$(C$_2$O$_4$)$_2$ | 0.5 | <1 |
| | | | | VC | 0.3 | |
| D-30 | 1 | Li$^+$ | 1 | LiPO$_2$F$_2$ | 0.5 | 1 |
| | | | | VC | 0.5 | |
| D-4 | — | — | — | LiPO$_2$F$_2$ | 0.5 | <1 |
| | | | | VC | 0.5 | |
| D-31 | 1 | Li$^+$ | 1 | LiPF$_2$(C$_2$O$_4$)$_2$ | 0.5 | 1 |
| | | | | VC | 1.0 | |
| | | | | LiPO$_2$F$_3$ | 0.2 | |
| | | | | LiSO$_3$F | 0.2 | |
| D-32 | — | — | — | LiPF$_2$(C$_2$O$_4$)$_2$ | 0.5 | <1 |
| | | | | VC | 1.0 | |
| | | | | LiPO$_2$F$_2$ | 0.2 | |
| | | | | LiSO$_3$F | 0.2 | |
| D-33 | 1 | Li$^+$ | 1 | LiPO$_2$F$_2$ | 0.3 | 1 |
| | | | | LiSO$_3$F | 0.3 | |
| | | | | VC | 1.0 | |
| D-34 | — | — | — | LiPO$_2$F$_2$ | 0.3 | <1 |
| | | | | LiSO$_2$F | 0.3 | |
| | | | | VC | 1.0 | |
| D-35 | 1 | Li$^+$ | 1 | LiPO$_2$F$_2$ | 0.5 | 1 |
| | | | | LiSO$_3$F | 0.5 | |
| | | | | VC | 1.0 | |
| | | | | t-Butylbenzene | 1.5 | |
| D-36 | — | — | — | LiPO$_2$F$_2$ | 0.5 | <1 |
| | | | | LiSO$_3$F | 0.5 | |
| | | | | VC | 1.0 | |
| | | | | t-Butylbenzene | 1.5 | |
| D-37 | 1 | Li$^+$ | 1 | LiPO$_2$F$_2$ | 0.5 | 1 |
| | | | | LiSO$_3$F | 0.5 | |
| D-38 | — | — | — | LiPO$_2$F$_2$ | 0.5 | <1 |
| | | | | LiSO$_3$F | 0.5 | |
| | | | | VC | 1.0 | |
| | | | | Fluorobenzene | 2.0 | |
| D-39 | 1 | Li$^+$ | 1 | LiPO$_2$F$_3$ | 0.5 | 1 |
| | | | | LiSO$_2$F | 0.5 | |
| | | | | VC | 1.0 | |
| | | | | Cyclohexylbenzene | 1.5 | |
| D-40 | — | — | — | LiPO$_2$F$_2$ | 0.5 | <1 |
| | | | | LiSO$_3$F | 0.5 | |
| | | | | VC | 1.0 | |
| | | | | Cyclohexylbenzene | 1.5 | |

TABLE 15

| | Electrolyte No. | Positive electrode active material | Negative electrode active material | Internal resistance* [%] | Amount of gas generated* [%] |
|---|---|---|---|---|---|
| Ex. 11-1 | D-1 | $LiNi_{1/3}Co_{1/3}Mn_{1/3}O_2$ | Graphite | 70 | 62 |
| Comp. Ex. 11-1 | D-2 | | | 100 | 100 |
| Ex. 11-2 | D-3 | | | 75 | 69 |
| Comp. Ex. 11-2 | D-4 | | | 100 | 100 |
| Ex. 11-3 | D-5 | | | 74 | 69 |
| Comp. Ex. 11-3 | D-6 | | | 100 | 100 |
| Ex. 11-4 | D-7 | $LiNi_{0.6}Co_{0.2}Mn_{0.2}O_2$ | | 78 | 61 |
| Comp. Ex. 11-4 | D-8 | | | 100 | 100 |
| Ex. 11-5 | D-9 | | | 70 | 60 |
| Comp. Ex. 11-5 | D-10 | | | 100 | 100 |
| Ex. 11-6 | D-11 | $LiNi_{0.6}Co_{0.2}Mn_{0.2}O_2$ + $LiMn_2O_4$ | | 76 | 59 |
| Comp. Ex. 11-6 | D-12 | | | 100 | 100 |
| Ex. 11-7 | D-13 | | | 78 | 65 |
| Comp. Ex. 11-7 | D-14 | | | 100 | 100 |
| Ex. 11-8 | D-15 | | | 74 | 58 |
| Comp. Ex. 11-8 | D-16 | | | 100 | 100 |
| Ex. 11-9 | D-17 | $LiNi_{0.6}Co_{0.2}Mn_{0.2}O_2$ | Graphite (containing silicon) | 69 | 60 |
| Comp. Ex. 11-9 | D-18 | | | 100 | 100 |
| Ex. 11-10 | D-19 | | | 69 | 59 |
| Comp. Ex. 11-10 | D-20 | | | 100 | 100 |
| Ex. 11-11 | D-21 | | | 72 | 64 |
| Comp. Ex. 11-11 | D-22 | | | 100 | 100 |
| Ex. 11-12 | D-23 | $LiNi_{1/3}Co_{1/3}Mn_{1/3}O_3$ | Hard carbon | 70 | 62 |
| Comp. Ex. 11-12 | D-24 | | | 100 | 100 |
| Ex. 11-13 | D-25 | | | 69 | 60 |
| Comp. Ex. 11-13 | D-26 | | | 100 | 100 |
| Ex. 11-14 | D-27 | $LiNi_{0.6}Co_{0.2}Mn_{0.2}O_2$ | Graphite (containing silicon) | 68 | 62 |
| Comp. Ex. 11-14 | D-28 | | | 100 | 100 |
| Ex. 11-15 | D-29 | $LiNi_{1/3}Co_{1/3}Mn_{1/3}O_2$ | Graphite | 71 | 63 |
| Comp. Ex. 11-1 | D-2 | | | 100 | 100 |
| Ex. 11-16 | D-30 | | | 77 | 71 |

TABLE 15-continued

| | Electrolyte No. | Positive electrode active material | Negative electrode active material | Internal resistance* [%] | Amount of gas generated* [%] |
|---|---|---|---|---|---|
| Comp. Ex. 11-2 | D-4 | | | 100 | 100 |
| Ex. 11-17 | D-31 | | | 69 | 65 |
| Comp. Ex. 11-15 | D-32 | | | 100 | 100 |
| Ex. 11-18 | D-33 | | | 75 | 69 |
| Comp. Ex. 11-16 | D-34 | | | 100 | 100 |
| Ex. 11-19 | D-35 | | | 78 | 65 |
| Comp. Ex. 11-17 | D-36 | | | 100 | 100 |
| Ex. 11-20 | D-37 | | | 74 | 65 |
| Comp. Ex. 11-18 | D-38 | | | 100 | 100 |
| Ex. 11-21 | D-39 | | | 77 | 70 |
| Comp. Ex. 11-19 | D-40 | | | 100 | 100 |

(*For Examples 11-1 to 11-14, values relative to the values of Comparative Examples 11-1 to 11-14, respectively, designated as 100

For Example 11-15, the relative value relative to the value of Comparative Example 11-1 designated as 100

For Example 11-16, the relative value relative to the value of Comparative Example 11-2 designated as 100

For Example 11-17, the relative value relative to the value of Comparative Example 11-15 designated as 100

For Example 11-18, the relative value relative to the value of Comparative Example 11-16 designated as 100

For Example 11-19, the relative value relative to the value of Comparative Example 11-17 designated as 100

For Example 11-20, the relative value relative to the value of Comparative Example 11-18 designated as 100

For Example 11-21, the relative value relative to the value of Comparative Example 11-19 designated as 100)

As shown above, even when an additional solute and an additive is added to the electrolyte together with $LiPF_6$ in the examples, wherein the total number of the kinds of lithium salts contained was three, four or more, the internal resistance characteristic of a laminated cell containing the electrolyte for a non-aqueous electrolyte battery of the present invention and the amount of gas generated were both excellent, as compared to the respective corresponding comparative examples. These results show that, by using the electrolyte for a non-aqueous electrolyte battery of the present invention, a non-aqueous electrolyte battery having an excellent internal resistance characteristic and an excellent effect to suppress the amount of gas generated is obtained regardless of the kinds of the additional solutes and the additives.

Examples 12-1 to 12-6 and Comparative Examples 12-1 to 12-6

Experimental Example Wherein Different Non-Aqueous Solvents were Used

Non-aqueous electrolytes Nos. E-1 to E-12 were prepared and evaluated in the same manner as in Example 1-1 except that the fundamental composition of the solute and the non-aqueous solvent and the like were as specified in the preparation conditions shown in Table 16. The concentration of the total amount of the compounds represented by the general formulae [2] to [5] in each electrolyte was lower than 5 ppm by mass. The concentration of free acid in each electrolyte used in the examples was not higher than 120 ppm by mass. The results of evaluation of the resultant batteries containing the electrolytes are shown in Table 17. In Table 17, the value of the internal resistance characteristic of each battery at −30° C. and the value of the amount of gas generated are relative values relative to the internal resistance characteristic after the cycle test and the amount of gas generated associated with the cycle test of a laminated cell assembled using an electrolyte that does not contain the imide anion-containing salt of the present invention, respectively, designated as 100.

TABLE 16

| Electrolytic solution No. | Fundamental composition of non-aqueous electrolyte (volume ratio of solvent) | Imide anion-containing salt | | | Additional solute and additive | | Concentration of total amount of compounds represented by general formulae [2] to [5] (ppm by mass) |
|---|---|---|---|---|---|---|---|
| | | Anion compound No. | Counter cation | Concentration [mass %] | Compound | Concentration [mass %] | |
| E-1 | 1.0M LiPF$_6$ EC(25)/DEC(75) | 5 6 | Li$^+$ Li$^+$ | 0.5 1.0 | LiPF$_2$(C$_2$O$_4$)$_2$ VC | 0.5 0.3 | 1 |
| E-2 | 1.0M LiPF$_6$ EC(25)/DEC(75) | — | — | — | LiPF$_2$(C$_2$O$_4$)$_2$ VC | 0.5 0.3 | <1 |
| E-3 | 1.0M LiPF$_6$ EC(20)/DEC(40)/ EMC(40) | 5 6 | Li$^+$ Li$^+$ | 0.5 1.0 | LiPF$_2$(C$_2$O$_4$)$_2$ VC | 0.5 0.3 | 1 |
| E-4 | 1.0M LiPF$_6$ EC(20)/DEC(40)/ EMC(40) | — | — | — | LiPF$_2$(C$_2$O$_4$) VC | 0.5 0.3 | <1 |
| E-5 | 0.8M LiPF$_6$ EC(30)/DMC(30)/ EMC(40) | 1 15 | Li$^+$ Li$^+$ | 2.0 0.1 | LiPO$_2$F$_2$ VC | 0.5 0.5 | 2 |
| E-6 | 0.8M LiPF$_6$ EC(30)/DMC(30)/ EMC(40) | — | — | — | LiPO$_2$F$_2$ VC | 0.5 0.5 | <1 |
| E-7 | 1.3M LiPF$_6$ EC(15)/PC(5)/DMC(50)/EMC(30) | 5 6 | Li$^+$ Li$^+$ | 0.5 0.5 | LiPF$_2$(C$_2$O$_4$)$_2$ LiPF$_4$(C$_2$O$_4$) | 0.5 0.2 | <1 |
| E-8 | 1.3M LiPF$_6$ EC(15)/PC(5)/DMC(50)/EMC(30) | — | — | — | LiPF$_2$(C$_2$O$_4$)$_2$ LiPF$_4$(C$_2$O$_4$) | 0.5 0.2 | <1 |
| E-9 | 1.3M LiPF$_6$ EC(15)/DEC(40)/ EMC(25)/EP(20) | 1 6 | Li$^+$ Li$^+$ | 1 1 | LiN(F$_2$PO)$_2$ LiPO$_2$F$_2$ t-Amylbenzene VC | 0.005 0.01 1.0 1.0 | 3 |
| E-10 | 1.3M LiPF$_6$ EC(15)/DEC(40)/ EMC(25)/EP(20) | — | — | — | LiN(F$_2$PO)$_2$ LiPO$_2$F$_2$ t-Amylbenzene VC | 0.005 0.01 1.0 1.0 | <1 |
| E-11 | 1.0M LiPF$_6$ + 0.1M LiBF$_4$ PC(30)/DEC(40)/ EP(30) | 1 | Li$^+$ | 0.5 | LiB(C$_2$O$_4$)$_2$ LiSO$_2$F LiN(FSO$_2$)$_2$ LiPO$_2$F$_2$ VC | 0.5 0.2 0.2 0.05 0.5 | 1 |
| E-12 | 1.0M LiPF$_6$ + 0.1M LiBF$_4$ PC(30)/DEC(40)/ EP(30) | — | — | — | LiB(C$_2$O$_4$)$_2$ LiSO$_2$F LiN(FSO$_2$)$_2$ LiPO$_2$F$_2$ VC | 0.5 0.2 0.2 0.05 0.5 | <1 |

TABLE 17

| | Electrolyte No. | Positive electrode active material | Negative electrode active material | Internal resistance* [%] | Amount of gas generated* [%] |
|---|---|---|---|---|---|
| Ex. 12-1 | E-1 | LiNi$_{1/3}$Co$_{1/3}$Mn$_{1/3}$O$_2$ | Graphite | 76 | 65 |
| Comp. Ex. 12-1 | E-2 | | | 100 | 100 |
| Ex. 12-2 | E-3 | | | 73 | 63 |
| Comp. Ex. 12-2 | E-4 | | | 100 | 100 |
| Ex. 12-3 | E-5 | | | 74 | 64 |
| Comp. Ex. 12-3 | E-6 | | | 100 | 100 |

TABLE 17-continued

| | Electrolyte No. | Positive electrode active material | Negative electrode active material | Internal resistance* [%] | Amount of gas generated* [%] |
|---|---|---|---|---|---|
| Ex. 12-4 | E-7 | | | 72 | 65 |
| Comp. Ex. 12-4 | E-8 | $LiNi_{0.6}Co_{0.2}Mn_{0.2}O_2$ | | 100 | 100 |
| Ex. 12-5 | E-9 | | | 68 | 62 |
| Comp. Ex. 12-5 | E-10 | | | 100 | 100 |
| Ex. 12-6 | E-11 | | Hard carbon | 65 | 62 |
| Comp. Ex. 12-6 | E-12 | | | 100 | 100 |

(*For Examples 12-1 to 12-6, the values relative to the values of Comparative Examples 12-1 to 12-6, respectively, designated as 100)

It was confirmed from the above results that, even when a different kind of non-aqueous solvent was used, the laminated cell containing the electrolyte for a non-aqueous electrolyte battery according to the present invention was excellent in an internal resistance characteristic and an amount of gas generated, as compared to the corresponding comparative example. Therefore, it was shown that, by using the electrolyte for a non-aqueous electrolyte battery of the present invention, a non-aqueous electrolyte battery having an excellent internal resistance characteristic and an excellent effect to suppress the amount of gas generated is obtained regardless of the kind of the non-aqueous solvent.

Table 18 shows the results obtained when electrolytes Nos. A-1, A-15 and A-35 were used as an electrolyte and the positive electrodes and negative electrodes were changed.

TABLE 18

| | Electrolyte No. | Positive electrode active material | Negative electrode active material | Internal resistance* [%] | Amount of gas generated* [%] |
|---|---|---|---|---|---|
| Ex. 3-1 | A-1 | $LiNi_{1/3}Co_{1/3}Mn_{1/3}O_2$ | $Li_4Ti_5O_{12}$ | 80 | 70 |
| Ex. 3-2 | A-15 | | | 82 | 72 |
| Comp. Ex. 3-1 | A-35 | | | 100 | 100 |
| Ex. 1-1 | A-1 | | Graphite | 61 | 48 |
| Ex. 1-15 | A-15 | | | 63 | 52 |
| Comp. Ex. 1-1 | A-35 | | | 100 | 100 |
| Ex. 5-1 | A-1 | | Hard carbon | 65 | 55 |
| Ex. 5-2 | A-15 | | | 68 | 59 |
| Comp. Ex. 5-1 | A-35 | | | 100 | 100 |
| Ex. 8-1 | A-1 | $LiMn_2O_4$ | Graphite | 72 | 60 |
| Ex. 8-2 | A-15 | | | 75 | 65 |
| Comp. Ex. 8-1 | A-35 | | | 100 | 100 |
| Ex. 9-1 | A-1 | $LiFePO_4$ | | 75 | 75 |
| Ex. 9-2 | A-15 | | | 78 | 78 |
| Comp. Ex. 9-1 | A-35 | | | 100 | 100 |

*For Examples 3-1 and 3-2, the relative value relative to the value of Comparative Example 3-1 designated as 100
*For Examples 1-1 and 1-15, the relative value relative to the value of Comparative Example 1-1 designated as 100
*For Examples 5-1 and 5-2, the relative value relative to the value of Comparative Example 5-1 designated as 100
*For Examples 8-1 and 8-2, the relative value relative to the value of Comparative Example 8-1 designated as 100
*For Examples 9-1 and 9-2, the relative value relative to the value of Comparative Example 9-1 designated as 100

<Comparison of Effects Based on Negative Electrode>

The results of Examples 1-1 and 1-15 and Examples 5-1 and 5-2 in each of which a negative electrode active material with a low negative electrode potential was used, in comparison to Examples 3-1 and 3-2 in each of which $Li_4Ti_5O_{12}$ with a high negative electrode electric potential was used as a negative electrode active material, show that the non-aqueous electrolyte battery containing the electrolyte for a non-aqueous electrolyte battery of the present invention had an excellent internal resistance characteristic and an excellent effect to suppress the amount of gas generated, when the non-aqueous electrolyte battery contained a negative electrode active material with a negative electrode electric potential lower than 1.5 V (Li/Li$^+$).

<Comparison of Effects Based on Positive Electrode>

The results of Examples 1-1 and 1-15 in each of which an active material having a layered, rock-salt structure was used, in comparison to Examples 8-1 and 8-2 in each of which $LiMn_2O_4$ having a spinel structure was used as a positive electrode active material and Examples 9-1 and 9-2 in each of which $LiFePO_4$ having an olivine structure was used as a positive electrode active material, show that the non-aqueous electrolyte battery containing the electrolyte for a non-aqueous electrolyte battery of the present invention had an excellent internal resistance characteristic and an excellent effect to suppress the amount of gas generated, when the non-aqueous electrolyte battery contained a positive electrode active material having a layered, rock-salt structure.

The invention claimed is:

1. An electrolyte for a non-aqueous electrolyte battery, comprising:

a non-aqueous solvent and at least one of hexafluorophosphate and tetrafluoroborate as a solute, and at least one imide anion-containing salt represented by the following formula [1]:

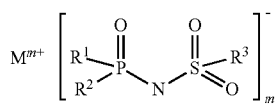 [1]

wherein in the formula [1], $R^1$, $R^2$ and $R^3$ each independently represent a fluorine atom or an organic group selected from the group consisting of a linear or branched $C_{1-10}$ alkyl group, a linear or branched $C_{1-10}$ alkoxy group, a $C_{2-10}$ alkenyl group, a $C_{2-10}$ alkenyloxy group, a $C_{2-10}$ alkynyl group, a $C_{2-10}$ alkynyloxy group, a $C_{3-10}$ cycloalkyl group, a $C_{3-10}$ cycloalkoxy group, a $C_{3-10}$ cycloalkenyl group, a $C_{3-10}$ cycloalkenyloxy group, a $C_{6-10}$ aryl group and a $C_{6-10}$ aryloxy group, wherein a fluorine atom, an oxygen atom or an unsaturated bond may be present in the organic group and wherein at least one of $R^1$, $R^2$ and $R^3$ represents a fluorine atom;

$M^{m+}$ represents an alkali metal cation, an alkaline-earth metal cation or an onium cation; and m is an integer equivalent to the valence of the corresponding cation;

wherein the electrolyte excludes a silane compound represented by the following formula [2], and the electrolyte excludes an ionic complex represented by any one of the following formula [3], formula [4] and formula [5]:

$Si(R^4)_a(R^5)_{4-a}$ [2]

wherein in the formula [2], each $R^4$ independently represents a group having a carbon-carbon unsaturated bond;

each $R^5$ independently represents a linear or branched $C_{1-10}$ alkyl group, which may contain a fluorine atom and/or an oxygen atom; and a is an integer of 2, 3 or 4;

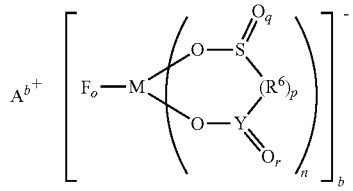 [3]

wherein in the formula [3], $A^{b+}$ represents at least one selected from the group consisting of a metal ion, a proton and an onium ion;

F represents a fluorine atom;

M represents at least one element selected from the group consisting of Al, B, Si, P, As and Sb;

O represents an oxygen atom;

S represents a sulfur atom;

$R^6$ represents a hydrocarbon group which may have a ring, a heteroatom, or a halogen atom, the hydrocarbon group having 1 to 10 carbon atoms ($R^6$ can also have a branched chain or a ring structure when a number of carbon atoms is 3 or more), or —$N(R^7)$—;

$R^7$ represents a hydrogen atom, an alkali metal, a hydrocarbon group which may have a ring, a heteroatom, or a halogen atom, the hydrocarbon group having 1 to 10 carbon atoms ($R^7$ can also have a branched chain or a ring structure when a number of carbon atoms is 3 or more);

Y represents a carbon atom or a sulfur atom; in the case wherein Y represents a carbon atom, r is 1; in the case wherein Y represents a sulfur atom, r is 1 or 2; and b is 1 or 2; o is 2 or 4; n is 1 or 2; p is 0 or 1; q is 1 or 2; r is 0, 1 or 2; and in the case wherein p is 0, a direct bond is formed between S and Y;

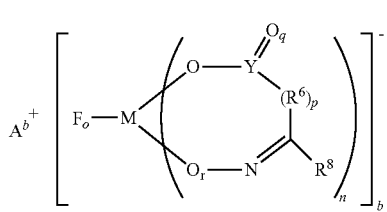 [4]

wherein in the formula [4], $A^{b+}$ represents at least one type selected from the group consisting of a metal ion, a proton and an onium ion;

F represents a fluorine atom;

M represents at least one element selected from the group consisting of Al, B, Si, P, As and Sb;

O represents an oxygen atom;

N represents a nitrogen atom;

Y represents a carbon atom or a sulfur atom; in the case wherein Y represents a carbon atom, q is 1; in the case wherein Y represents a sulfur atom, q is 1 or 2;

$R^6$ represents a hydrocarbon group which may have a ring, a heteroatom, or a halogen atom, the hydrocarbon group having 1 to 10 carbon atoms ($R^6$ can also have a branched chain or a ring structure when a number of carbon atoms is 3 or more), or —$N(R^7)$—;

$R^7$ represents a hydrogen atom, an alkali metal, a hydrocarbon group which may have a ring, a heteroatom, or a halogen atom, the hydrocarbon group having 1 to 10 carbon atoms ($R^7$ can also have a branched chain or a ring structure when a number of carbon atoms is 3 or more);

$R^8$ represents a hydrogen atom, a hydrocarbon group which may have a ring, a heteroatom, or a halogen atom, the hydrocarbon group having 1 to 10 carbon atoms ($R^8$ can also have a branched chain or a ring structure when a number of carbon atoms is 3 or more), or —$N(R^7)$—; and b is 1 or 2; o is 2 or 4; n is 1 or 2; p is 0 or 1; q is 1 or 2; r is 0 or 1; in the case wherein p is 0, Y and a carbon atom positioning at both sides of $R^6$ form a direct bond; and in the case wherein r is 0, a direct bond is formed between M and N;

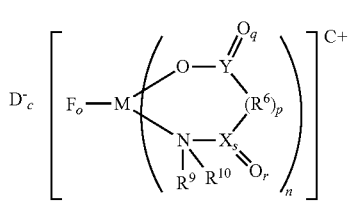 [5]

wherein in the formula [5],

D represents at least one selected from a halogen ion, a hexafluorophosphate anion, a tetrafluoroborate anion, a bis(trifluoromethanesulfonyl)imide anion, a bis(fluorosulfonyl)imide anion, a (fluorosulfonyl)(trifluoromethanesulfonyl)imide anion and a bis(difluorophosphonyl)imide anion;

F represents a fluorine atom;

M represents one element selected from the group consisting of Al, B, Si, P, As and Sb;

O represents an oxygen atom;

N represents a nitrogen atom;

Y represents a carbon atom or a sulfur atom; in the case wherein Y represents a carbon atom, q is 1; in the case wherein Y represents a sulfur atom, q is 1 or 2;

X represents a carbon atom or a sulfur atom; in the case wherein X represents a carbon atom, r is 1; in the case wherein X represents a sulfur atom, r is 1 or 2;

$R^6$ represents a hydrocarbon group which may have a ring, a heteroatom, or a halogen atom, the hydrocarbon group having 1 to 10 carbon atoms ($R^6$ can also have a branched chain or a ring structure when a number of carbon atoms is 3 or more), or $—N(R^7)—$;

$R^7$ represents a hydrogen atom, an alkali metal, a hydrocarbon group which may have a ring, a heteroatom, or a halogen atom, the hydrocarbon group having 1 to 10 carbon atoms ($R^7$ can also have a branched chain or a ring structure when a number of carbon atoms is 3 or more); and $R^9$ and $R^{10}$ independently represent a hydrocarbon group which may have a ring, a heteroatom, or a halogen atom, the hydrocarbon group having 1 to 10 carbon atoms ($R^9$ and $R^{10}$ can also have a branched chain or a ring structure when a number of carbon atoms is 3 or more); a ring structure specified by the following formula [6] is optionally contained:

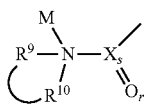

[6]

c is 0 or 1; in the case wherein n is 1, c is 0 (in the case wherein c is 0, D does not exist); in the case wherein n is 2, c is 1;

o is 2 or 4; n is 1 or 2; p is 0 or 1; q is 1 or 2; r is 1 or 2; s is 0 or 1; in the case wherein p is 0, a direct bond is formed between Y and X; and in the case wherein s is 0, $N(R^9)(R^{10})$ is directly bonded to $R^6$; in this case, any one of the following structures of formula [7], formula [8], formula [9] and formula [10] may be formed; in the case wherein the direct bond is a double bond as in the formula [8] or formula [10], $R^{10}$ does not exist; a structure having a double bond outside the ring may be formed; in this case, $R^{11}$ and $R^{12}$ independently represent a hydrogen atom, or a hydrocarbon group which may have a ring, a heteroatom, or a halogen atom, the hydrocarbon group having 1 to 10 carbon atoms, wherein when a number of carbon atoms is 3 or more, $R^{11}$ and $R^{12}$ can also have a branched chain or a ring structure,

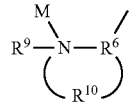

[7]

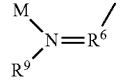

[8]

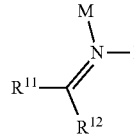

[9]

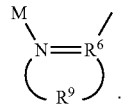

[10]

2. The electrolyte for a non-aqueous electrolyte battery according to claim 1, wherein in the imide anion-containing salt represented by the formula [1] $R^1$, $R^2$ and $R^3$ are fluorine atoms.

3. The electrolyte for a non-aqueous electrolyte battery according to claim 1, wherein in the imide anion-containing salt represented by the formula [1] at least one of $R^1$, $R^2$ and $R^3$ represents a fluorine atom, and at least one of $R^1$, $R^2$ and $R^3$ is selected from a hydrocarbon group containing six or less carbon atoms and optionally containing a fluorine atom.

4. The electrolyte for a non-aqueous electrolyte battery according to claim 1, wherein in the imide anion-containing salt represented by the formula [1] at least one of $R^1$, $R^2$ and $R^3$ represents a fluorine atom, and at least one of R', $R^2$ and $R^3$ is selected from the group consisting of a methyl group, a methoxy group, an ethyl group, an ethoxy group, a propyl group, a propoxyl group, a vinyl group, an allyl group, an allyloxy group, an ethynyl group, a 2-propynyl group, a 2-propynyloxy group, a phenyl group, a phenyloxy group, a 2,2-difluoroethyl group, a 2,2-difluoroethyloxy group, a 2,2,2-trifluoroethyl group, a 2,2,2-trifluoroethyloxy group, a 2,2,3,3-tetrafluoropropyl group, a 2,2,3,3-tetrafluoropropyloxy group, a 1,1,1,3,3,3-hexafluoroisopropyl group and a 1,1,1,3,3,3-hexafluoroisopropyloxy group.

5. The electrolyte for a non-aqueous electrolyte battery according to claim 1, wherein the $M^{m+}$ of the imide anion-containing salt represented by the formula [1] is selected from the group consisting of a lithium ion, a sodium ion, a potassium ion and a tetraalkylammonium ion.

6. The electrolyte for a non-aqueous electrolyte battery according to claim 1, further comprising at least one additional solute selected from the group consisting of $LiPF_2(C_2O_4)_2$, $LiPF_4(C_2O_4)$, $LiP(C_2O_4)_3$, $LiBF_2(C_2O_4)$, $LiB(C_2O_4)_2$, $LiPO_2F_2$, $LiN(F_2PO)_2$, $LiN(FSO_2)_2$, $LiN(CF_3SO_2)_2$, $LiN(CF_3SO_2)(FSO_2)$, $LiSO_3F$, $NaPF_2(C_2O_4)_2$, $NaPF_4(C_2O_4)$, $NaP(C_2O_4)_3$, $NaBF_2(C_2O_4)$, $NaB(C_2O_4)_2$, $NaPO_2F_2$, $NaN(F_2PO)_2$, $NaN(FSO_2)_2$, $NaSO_3F$, $NaN(CF_3SO_2)_2$ and $NaN(CF_3SO_2)(FSO_2)$.

7. The electrolyte for a non-aqueous electrolyte battery according to claim 1, wherein the imide anion-containing salt represented by the formula [1] is added in an amount ranging from 0.005 to 12.0 mass % relative to a total amount of the non-aqueous solvent, the solute and the imide anion-containing salt represented by the formula [1].

8. The electrolyte for a non-aqueous electrolyte battery according to claim 1, further comprising at least one additive selected from the group consisting of vinylene carbonate, vinylethylene carbonate, fluoroethylene carbonate, 1,6-diisocyanatohexane, ethynylethylene carbonate, trans-difluoroethylene carbonate, propane sultone, propenesultone, 1,3,2-dioxathiolan-2,2-dioxide, 4-propyl-1,3,2-dioxathiolan-2,2-dioxide, methylene methane disulfonate, 1,2-ethanedisulfonic anhydride, tris(trimethylsilyl)borate, succinonitrile, (ethoxy)pentafluorocyclotriphosphazene, t-butylbenzene, t-amylbenzene, fluorobenzene, and cyclohexylbenzene.

9. The electrolyte for a non-aqueous electrolyte battery according to claim 1, wherein the non-aqueous solvent is at least one selected from the group consisting of a cyclic carbonate, a chain carbonate, a cyclic ester, a chain ester, a cyclic ether, a chain ether, a sulfone compound, a sulfoxide compound and an ionic liquid.

10. A non-aqueous electrolyte battery comprising at least a positive electrode, a negative electrode, and the electrolyte for a non-aqueous electrolyte battery according to claim 1.

* * * * *